United States Patent
Austrheim

(10) Patent No.: US 12,187,537 B2
(45) Date of Patent: Jan. 7, 2025

(54) AUTOMATED STORAGE AND RETRIEVAL SYSTEM USING AN AUTOMATED LOADER AND METHODS OF REPLACING POWER SUPPLIES

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 291 days.

(21) Appl. No.: 17/636,307

(22) PCT Filed: Sep. 8, 2020

(86) PCT No.: PCT/EP2020/075015
§ 371 (c)(1),
(2) Date: Feb. 17, 2022

(87) PCT Pub. No.: WO2021/052807
PCT Pub. Date: Mar. 25, 2021

(65) Prior Publication Data
US 2022/0289481 A1    Sep. 15, 2022

(30) Foreign Application Priority Data
Sep. 16, 2019 (NO) .................................. 20191118

(51) Int. Cl.
*B65G 1/06* (2006.01)
*B60L 5/38* (2006.01)
(Continued)

(52) U.S. Cl.
CPC ................ *B65G 1/065* (2013.01); *B60L 5/38* (2013.01); *B60L 53/80* (2019.02); *B65G 1/0464* (2013.01);
(Continued)

(58) Field of Classification Search
CPC ......... B60L 53/80; B60L 53/36; B65G 54/02; B65G 1/0464
See application file for complete search history.

(56) References Cited

U.S. PATENT DOCUMENTS

| | | | |
|---|---|---|---|
| 2009/0139940 A1 | 6/2009 | Maniscalco et al. | |
| 2010/0071979 A1 | 3/2010 | Heichal et al. | |

(Continued)

FOREIGN PATENT DOCUMENTS

| | | | |
|---|---|---|---|
| CN | 105899398 A | 8/2016 | |
| CN | 109328150 A | 2/2019 | |

(Continued)

OTHER PUBLICATIONS

Office Action issued in counterpart Chinese Patent Application No. 2020800650520 mailed on Feb. 28, 2023 (22 pages).

(Continued)

*Primary Examiner* — Kaitlin S Joerger
(74) *Attorney, Agent, or Firm* — Baker Botts L.L.P.

(57) ABSTRACT

An automated storage and retrieval system includes at least one container handling vehicle, a horizontal rail system for the container handling vehicle to run on, and a charging station for recharging a replaceable power source of the container handling vehicle. The container handling vehicle includes a power supply compartment for accommodating a replaceable power supply when the container handling vehicle is in use. The charging station includes one or more charging racks. Each charging rack provides a column of charging positions for recharging replaceable power supplies and each charging position is configured to accommodate a replaceable power supply during a recharging process. The charging station includes an automated loader including a power supply support. The automated loader is arranged to move vertically and horizontally for exchanging and transporting a replaceable power supply between the charging (Continued)

rack and the power supply compartment of the container handling vehicle.

20 Claims, 23 Drawing Sheets

(51) Int. Cl.
  *B60L 53/80* (2019.01)
  *B65G 1/04* (2006.01)
  *B66F 9/075* (2006.01)
(52) U.S. Cl.
  CPC ......... *B66F 9/0754* (2013.01); *B60L 2200/44* (2013.01)

(56) References Cited

U.S. PATENT DOCUMENTS

| | | | |
|---|---|---|---|
| 2011/0106294 A1 | 5/2011 | Bebbington | |
| 2012/0068664 A1* | 3/2012 | Franzen | B60S 5/06 414/277 |
| 2019/0232925 A1* | 8/2019 | Hognaland | H02J 7/0045 |
| 2021/0032036 A1* | 2/2021 | Austrheim | B60L 53/36 |
| 2021/0155407 A1* | 5/2021 | Austrheim | B66F 9/063 |
| 2021/0170895 A1* | 6/2021 | Austrheim | B65G 1/0464 |
| 2021/0403237 A1* | 12/2021 | Austrheim | B65G 1/0464 |

FOREIGN PATENT DOCUMENTS

| | | |
|---|---|---|
| NO | 317366 B1 | 10/2004 |
| WO | 2014/075937 A1 | 5/2014 |
| WO | 2014/090684 A1 | 6/2014 |
| WO | 2015/104263 A2 | 7/2015 |
| WO | 2015/193278 A1 | 12/2015 |
| WO | 2016/120075 A1 | 8/2016 |
| WO | 2017/220627 A1 | 12/2017 |
| WO | 2018/210851 A1 | 11/2018 |
| WO | 2018/210923 A1 | 11/2018 |
| WO | 2019/092029 A1 | 5/2019 |

OTHER PUBLICATIONS

International Search Report issued in PCT/EP2020/075015 on Nov. 12, 2020 (8 pages).
Written Opinion of the International Searching Authority issued in PCT/EP2020/075015 on Nov. 12, 2020 (10 pages).
Shang Jack; "Our Lithium battery for electric bus"; May 5, 2013; Retrieved from the Internet: URL:https://www.youtube.com/watch?v=RpVZjq7i-gk (2 pages).
Zhuo Jia; "EV using battery swap at 2008 Olympic Games"; Apr. 19, 2012; Retrieved from the Internet: URL:https://www.youtube.com/watch?v=91v0_1nLWG (2 pages).
Office Action issued in the counterpart Norwegian Patent Application No. 20191118, mailed on Mar. 11, 2020 (5 pages).

* cited by examiner

AUTOMATED STORAGE AND RETRIEVAL SYSTEM USING AN AUTOMATED LOADER AND METHODS OF REPLACING POWER SUPPLIES

TECHNICAL FIELD

The present invention relates to an automated storage and retrieval system for storage and retrieval of containers handled by container handling vehicles, with an automated loader for changing power supplies in the container handling vehicles. The invention further relates to methods of retrieving power supplies out from, and inserting power supplies into, power compartments in the container handling vehicles and charging positions in a charging rack, respectively.

BACKGROUND AND PRIOR ART

FIG. 1 discloses a typical prior art automated storage and retrieval system 1 with a framework structure 100 and FIGS. 2 and 3 discloses two different prior art container handling vehicles 201, 301 suitable for operating on such a system 1.

The framework structure 100 comprises a number of upright members 102 and a number of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage grid 104, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel tracks 110 arranged to guide movement of the container handling vehicles 201, 301 in a first direction X across the top of the frame structure 100, and a second set of parallel tracks 111 arranged perpendicular to the first set of tracks 110 to guide movement of the container handling vehicles 201, 301 in a second direction Y which is perpendicular to the first direction X. In this way, the rail system 108 defines grid columns 112 above which the container handling vehicles 201, 301 can move laterally above the storage columns 105, i.e. in a plane which is parallel to the horizontal X-Y plane.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. Each set of wheels 201b, 301b 201c, 301c can be lifted and lowered, so that the first set of wheels 201b, 301b and/or the second set of wheels 201c, 301c can be engaged with the respective set of tracks 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid disclosed in FIG. 1, Z=8 identifies the lowermost, bottom layer of the grid 104. Similarly, X=1 . . . n and Y=1 . . . n identifies the position of each grid column 112 in the horizontal plane. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 201, 301 can be said to travel in layer Z=0, and each grid column 112 can be identified by its X and Y coordinates.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicles 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

The rail system 108 may be a single rail system, as is shown in FIG. 4. Alternatively, the rail system 108 may be a double rail system, as is shown in FIG. 5, thus allowing a container handling vehicle 201 having a footprint generally corresponding to the lateral area defined by a grid column 112 to travel along a row of grid columns even if another container handling vehicle 201 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of tracks 110a, 110b of the first tracks 110 and a pair of tracks 111a, 111b of the second set of tracks 111. In FIG. 5 the grid cell 122 is indicated by a dashed box.

Consequently, tracks 110a and 110b form pairs of tracks defining parallel rows of grid cells running in the X direction, and tracks 111a and 111b form pairs of tracks defining parallel rows of grid cells running in the Y direction.

As shown in FIG. 6, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighbouring grid cells are arranged in contact with each other such that there is no space there-between.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

The grid 104 in FIG. 1 comprises two port columns 119 and 120. The first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 119, 120 and the access station.

If the ports 119, 120 and the access station are located at different levels, the conveyor system may comprise a lift device with a vertical component for transporting the storage containers 106 vertically between the port 119, 120 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting device (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201, 301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201, 301 so that a desired storage container 106 can be delivered to the desired location at the desired time without the container handling vehicles 201, 301 colliding with each other, the automated storage and retrieval system 1 comprises a control system which typically is computerized and which typically comprises a database for keeping track of the storage containers 106.

However, with the above described storage system there is an undesired robot standstill due to the need of recharge, thereby reducing the operational cycle of the storage system as a whole to typically 16 hours per day.

In WO2015/104263A2, the contents of which are incorporated herein by reference, a storage system is described solving the undesired standstill by arranging a number of charging stations at the perimeter of the storage grid. Each charging station has the capability of charging a power storage source on each vehicle. Further, the hook system used to connect the power storage source to the charging station is quite complex and thus more service intensive and prone to failure. In addition, the prior art hook system limits the potential lateral extent of a connected power storage source due to limited support of the power storage source in the lateral direction.

The inventive solutions described herein may be considered as representing a further development of the storage system as disclosed in WO2015/104263A2, where the above-mentioned disadvantages concerning space and stability are mitigated.

SUMMARY OF THE INVENTION

The present invention is set forth and characterized in the independent claims, while the dependent claims describe other characteristics of the invention.

The invention provides one or more of the following advantages over prior art:
- Higher concentration of batteries saving a lot of grid space and making the charging area compact
- Fewer points in the grid for electric power results in less need of cabling
- Can be arranged close to service areas, thereby it is easy to move the container handing vehicles to the service area in the event of failure during battery change
- Battery exchange may be performed at any location on the grid
- Flexible solution, easy to make backup solutions
- Chargers can be arranged in dedicated areas with improved fire-protection (dedicated rooms, increased sprinkler/fire protection units)
- The charging rack is provided as a modular arrangement of units, with the number of units being chosen to suit local charging needs. Each unit of the charging rack can fit into a grid cell of a grid-based rail system.

It is described an automated storage and retrieval system comprising at least one container handling vehicle, a horizontal rail system for the container handling vehicle to run on, and a charging station for recharging a replaceable power source of the container handling vehicle, wherein:
the container handling vehicle comprises a first set of wheels for moving the container handling vehicle upon the rail system in a first direction, a second set of wheels for moving the container handling vehicle upon the rail system in a second direction which is perpendicular to the first direction, and a power supply compartment within the container handling vehicle for accommodating a replaceable power supply when the container handling vehicle is in use; and the charging station is provided on or at the horizontal rail system, the charging station comprising one or more charging racks, each charging rack providing a column of charging positions for recharging replaceable power supplies and each charging position being configured to accommodate a replaceable power supply during a recharging process, the charging station further comprising an automated loader comprising a power supply support, the automated loader is arranged to move vertically and horizontally in said first and second directions for exchanging and transporting a replaceable power supply between the charging rack and the power supply compartment of the container handling vehicle by retrieving a first replaceable power supply from and inserting the first replaceable power supply into a charging position of the charging rack and by retrieving a second replaceable power supply from and inserting the second replaceable power supply into the power supply compartment of the container handling vehicle by the automated loader extending into said charging rack and power supply compartment.

The charging rack may comprise a charging connection such as an electrical socket or an electrical plug arranged at the different charging positions in the charging rack. The charging connection is adapted for establishing electrical communication with the power supply to be charged via a corresponding power supply charging connection arranged on the power supply.

The automated loader is preferably arranged on the rail system for moving the automated loader in at least one of the first direction or the second direction, wherein the rail system provides access to different grid positions on the rail grid.

The automated loader may comprise a first set of wheels for moving the automated loader upon the rail system in a first direction, a second set of wheels for moving the automated loader upon the rail system in a second direction which is perpendicular to the first direction. Movement of the power supply support in the Z direction may be along a substantially vertical column such that the replaceable power supplies may be inserted and retrieved from the power supply compartment and charging positions in the charging rack at different elevations. If the automated loader has wheels, the wheels may be located to allow other vehicles to pass or be passed on adjacent rows, for example, its perimeter may encircle an area of one or two grid cells (at least the vehicle module part of the loader).

In another embodiment, the automated loader may move in the X, Y, Z directions on an independent rail system, where one set of rails in the X or Y direction enables horizontal movement in one of said directions, a linear actuator enables movement in the other X or Y direction, and a vertical column configured for vertical guiding of the power supply support.

In an embodiment of the system, the power supply compartment comprises a power supply locking assembly arranged to lock the power supply in place within the power supply compartment.

In other words, the power supply locking assembly may be arranged to prevent an accommodated power supply from moving relative to the power supply compartment. In other words, the power supply locking assembly may prevent the power supply from moving laterally/horizontally relative the power supply compartment.

In an embodiment of the system, the power supply locking assembly is moveable between a first position (i.e. a locked position), in which the power supply locking assembly may hold one of the power supplies in place, and a second position (i.e. a released position), wherein the power supply may be moved.

In an embodiment of the system, the power supply locking assembly is locked in the first position by a releasable locking mechanism.

In an embodiment of the system, the power supply support is arranged to interact or go into engagement with the releasable locking mechanism and/or the power supply locking assembly, such that the power supply locking assembly may move into the second position when the power supply support is extended into the power supply compartment to retrieve a discharged power supply or insert a charged power supply.

The releasable locking mechanism may comprise at least one pivot arm arranged to interact with the power supply support, such that the locking mechanism is released.

In an embodiment of the system, the power supply locking assembly is pivotably connected to the upper part of the container handling vehicle, such that the power supply locking assembly may pivot between the first and second positions.

In an embodiment of the system, the power supply support of the automated loader comprises two laterally extending guide arms between which the replaceable power supply may be supported.

At least a section of each guide arm may be arranged to extend into the power supply compartment and/or at least an end section of at least one guide arm may be arranged to extend into the power supply compartment and/or at least the section of the guide arms between which the power supply may be supported is arranged to extend into the power supply compartment In an embodiment of the system, at least one of the guide arms comprises an end for interaction or engagement with the releasable locking mechanism and/or the power supply locking assembly.

In other words, at least one of the guide arms may comprise an end for interaction with the releasable locking mechanism and/or the power supply locking assembly, such that the power supply locking assembly may move into the second position. The end of at least one of the guide arms may be tapered.

In an embodiment of the system, the replaceable power supply comprises a support rib arranged on each of two opposite sides of the power supply, each support rib arranged to interact with a corresponding guide arm of the power supply support. The support ribs may extend laterally/horizontally along opposite sidewalls of the power supply.

In an embodiment of the system, each support rib comprises a profiled surface, such as a recess or protrusion, for interaction with a corresponding protrusion or recess, respectively, arranged on the guide arms.

In an embodiment of the system, the interacting/engagement recesses and protrusions are arranged such that the power supply is prevented from lateral movement when supported by the power supply support.

In an embodiment of the system, the power supply locking assembly comprises locking elements, the locking elements arranged to interact with the power supply, optionally via support ribs arranged on each of two opposite sides of the power supply, when the power supply is arranged in the power supply compartment and the power supply locking assembly is in the first position, such that the power supply is prevented from moving in at least a lateral direction.

In an embodiment of the system, the locking elements are arranged on two longitudinal sidewalls interconnected by a structural element, such that the sidewalls are fixed relative to each other.

In an embodiment of the system, the structural element is a power supply cover arranged to at least partly cover the power supply when the power supply is arranged in the power supply compartment and the power supply locking assembly is in the first position (i.e. the locked position).

In an embodiment of the system, the power supply locking assembly is pivotably connected to the upper part of the container handling vehicle via the two longitudinal sidewalls, the structural element or the power supply cover.

In an embodiment of the system, the wheel assembly of the container handling vehicles and the automated loader comprise a first set of wheels, arranged to engage with the first set of tracks, and a second set of wheels, arranged to engage with the second set of tracks, the first set of wheels is moveable between an upper and a lower wheel position, such that the first set of wheels engage with the first set of tracks in the lower wheel position and the second set of wheels engage with the second set of tracks when the first set of wheels is in the upper wheel position. In other words, the first set of wheels is moveable between an upper and lower position relative the upper part of the container handling vehicle, such that a level of the power supply compartment relative the first and second set of tracks is moveable between a lower and an upper level, respectively. The same applies to the first and second sets of wheels of the automated loader.

In an embodiment of the system, the power supply locking assembly is arranged to be in the first position when the power supply support extends into the power supply compartment and the first set of wheels is in the lower wheel position.

In an embodiment of the system, the power supply locking assembly is arranged to be in the second position when the power supply support extends into the power supply compartment and the first set of wheels is in the upper wheel position.

In an embodiment of the system the power supply is arranged to be supported by the power supply support, when the power supply support extends into the power supply compartment and the first set of wheels is in the upper wheel position.

In an embodiment of the system, the power supply is arranged to be separate from the power supply support and supported by at least one support surface arranged inside the power supply compartment, when the power supply support extends into the power supply compartment and the first set of wheels is in the lower wheel position. The at least one support surface may be an upwards facing surface.

In the lower connection position, the charging connection is arranged at a level corresponding to the level of the power supply charging connection when the power supply is supported by the power supply support.

In the upper connection position, the charging connection is arranged at a level corresponding to the level of the power supply charging connection when the power supply is accommodated in the power supply compartment and the first set of wheels is in the lower wheel position.

The charging connection may also be defined as being movable between the lower connection position and the upper connection position relative the power supply support.

In an embodiment of the system, the charging connection is biased towards the upper connection position. Alternatively, the charging connection can be biased towards a neutral position between the upper connection position and the lower connection position.

In other words, when the power supply support does not support a power supply, the charging connection will be in the upper connection position. The charging connection may be biased towards the upper connection position by any suitable resilient element, such as a spring.

In an embodiment of the guide arms, each guide arm comprises at least one recess or protrusion for interaction with profiled surface of the power supply, such that lateral movement of a supported power supply is prevented during transfer on the power supply support of the automated loader. In other words, the section of each guide arm may comprise at least one recess or protrusion for engagement with the power supply.

In a third aspect, the present invention provides a container handling vehicle for an automated storage system according to any embodiment of the first aspect, featuring a lower part comprising at least one storage compartment for storing a storage container, an upper part arranged vertically above the lower part, a wheel assembly for guiding the container handling vehicle along a track system in orthogonal X and Y direction and a power supply compartment for accommodating a replaceable power supply, wherein the wheel assembly comprises a first set of wheels, arranged to engage with a first set of tracks of the track system, and a second set of wheels, arranged to engage with a second set of tracks of the wheel system, the first set of wheels can be moved between an upper and a lower position, such that the first set of wheels engage with the first set of tracks in the lower position and the second set of wheels engage with the second set of tracks in the upper position, wherein the power supply compartment is arranged to receive the replaceable power supply via an opening facing in the direction in which the vehicle may move when the first set of wheels are in the lower position.

The opening may be in an upper portion of the container handling vehicle above a container receiving space/cavity.

In an embodiment of the container handling vehicle, the power supply compartment comprises a power supply locking assembly arranged to hold each of the power supplies in place within the power supply compartment, the power supply locking assembly is pivotally connected to the upper part of the container handling vehicle, such that the power supply locking assembly may pivot between a first position, in which the power supply locking assembly may hold one of the power supplies in place, and a second position, wherein the power supply may be moved.

In an embodiment of the container handling vehicle, the power supply locking assembly is locked in the first position by a releasable locking mechanism.

The container handling vehicle may comprise any of the features present in the container handling vehicle of the system according to the first aspect.

The power supply may be any device capable of generating electrical power such as a battery or a capacitor.

The charging position in the charging station rack is configured to releasably support, hold or suspend the power supply during charging.

Moreover, the power supply support may comprise two guiding pins (i.e. guiding arms) extending a distance L from an outer perimeter of the column. The horizontal separation between the two guiding pins may be equal or near equal to a geometrical size of the power supply, for example equal or near equal to the width of the power supply in case of a rectangular box shape. The two guiding pins are preferably mutually aligned in the horizontal plane.

The ends of the guiding pins may have a distinct form, such as tapered, to interact with a release mechanism arranged at or near the entrance opening of the power supply compartment within the container handling vehicle during operation. The tapered shape may for example activate pivoting of a pivot arm constituting part of the release mechanism, and where the pivoting movement of the pivot arm allows the power supply to slide into the power supply compartment. Other mechanisms may however be envisaged such as a release mechanism based on translational movements or a combination of pivoting movements and translational movements.

The lower end of the charging station rack may comprise a charging rack base plate to allow a stable coupling to the rail system. The charging station base plate may be configured to be fitted within the first set of parallel tracks and the second set of parallel tracks of the track system. For example, the perimeter of the base plate may be fixed to two or more inner side walls of the tracks within a grid cell. Alternatively, or in addition, the base plate may be mounted on the tracks, covering a plurality of grid cells.

The container handling vehicle may comprise a container-receiving storage space for accommodating a storage container; a lifting device arranged to transport a storage container vertically between a storage position in a stack and a transport position in the storage space. The lifting device may comprise a gripping device being configured to releasably grip a storage container; and a lifting motor being configured to raise and lower the gripping device relative to the storage space. The container-receiving storage space may be arranged centrally within the lower part of the container handling vehicle.

In addition, the arrangement of the power supply deeper into the horizontal extension of the vehicle, that is, nearer or at to the vehicle's gravitational centre axis, the overall stability conditions for the vehicle is increased.

It is further described an automated loader for a system as described above, wherein the automated loader is configured for replacing a replaceable power supply, the automated loader comprising a vertically and horizontally movable power supply support for releasably supporting the replaceable power supply, wherein the power supply support comprises two laterally extending guide arms by which the replaceable power supply may be supported, two guide arms each comprising a tapered end extending beyond a section of the guide arms by which the power supply may be supported, wherein the power supply support is arranged for exchanging and transporting the replaceable power supplies between a charging station rack and a power supply compartment of a container handling vehicle by retrieving the replaceable power supplies out from, and inserting the replaceable power supplies into, both the different levels in the charging station rack and the power supply compartment.

The section of each guide arm may comprise at least one profiled surface for engagement with the power supply, such that lateral movement of a replaceable power supply relative to the guide arms whilst the power supply is being transported between a charging rack and the vehicle, is prevented.

It is further described a charging rack for a charging station. The charging rack comprises a stack of charging positions, the charging positions being supported in a frame, each charging position spaced from the next as a vertical array, the charging rack comprising a mounting plate at a foot of the frame which is configured to mount within a space opening defined within parallel tracks of a rail system.

The frame may be supported by legs connected to the framework structure. In a possible configuration, the legs are supported by the upright members of the framework structure, for example as vertical extensions of the upright members. However, the legs may also be supported by the horizontal members of the framework structure and/or be supported by the rail system.

There may be a variety of numbers of charging positions, for example, greater than five, more preferably seven dependent on the demand of the specific projects. When arranged in the charging position, the power supply may be supported off-center relative an underlying grid opening such that the weight of the poser supply can be carried closer to the legs of the rail system than if they were located in the middle of the grid opening.

It is further described a method of transferring a power supply accommodated within a power supply compartment of a container handling vehicle to an unoccupied position in a charging rack of a charging station using an automated loader comprising a power supply support, the container handling vehicle being configured to move on a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks;

the method comprises the following steps:
a) maneuvering the vehicle and/or the automated loader into position where the power supply support is at least partly protruding into the power supply compartment containing the power supply,
b) loading the power supply onto the power supply support, and
c) transferring the power supply on the power supply support from the container handling vehicle to the unoccupied position in the charging rack of the charging station.

In an aspect of the method, the loading of the power supply from the power supply compartment of the container handling vehicle to the power supply support is achieved by adjusting the height of the power supply compartment relative to the underlying track system.

The transfer of the power supply from the power supply compartment of the container handling vehicle to the power supply support is achieved by adjusting the height of the power supply support of the movable changing device relative the power supply compartment.

The method may be conducted on an automated storage and retrieval system as discussed above.

It is further described a method of retrieving a rechargeable power supply accommodated in a charging position within a charging station rack and loading the rechargeable power supply into an empty power supply compartment of a container handling vehicle using an automated loader comprising a power supply support; the container handling vehicle being configured to move on a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks;

the method comprises the following steps:
maneuvering the automated loader to a charged power supply accommodated within the charging station rack by aligning the power supply support vertically and/or horizontally relative the power supply to be retrieved from the rack, loading the power supply onto the power supply support,
transferring the power supply on the power supply support from the charging station rack to the power supply compartment of the container handling vehicle.

In the following, numerous specific details are introduced by way of example only to provide a thorough understanding of embodiments of the claimed charging station, the system and the method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention. The drawings show embodiments of the invention, which will now be described by way of example only, where:

FIGS. 22A-C are perspective views of a second embodiment of a charging station according to the invention;

DETAILED DESCRIPTION OF THE INVENTION

Figure 1:
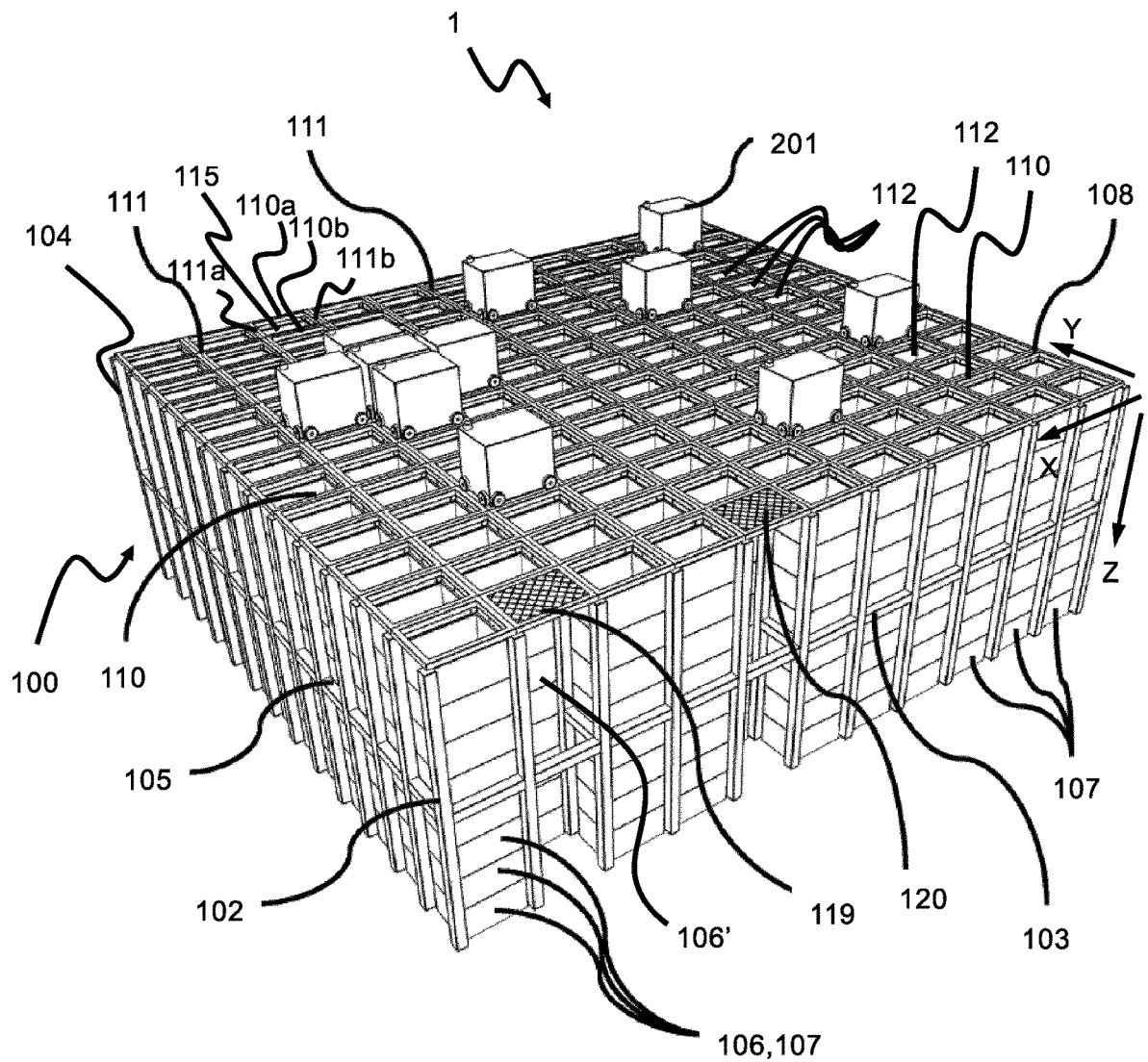
FIG. 1 is a perspective view of a grid of a prior art automated storage and retrieval system.
Figure 2:
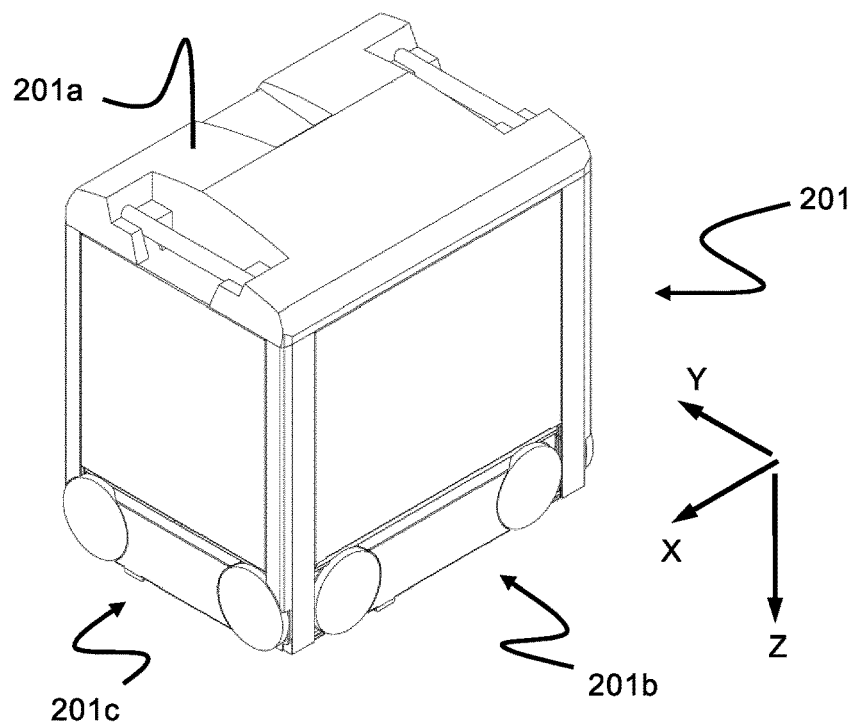
FIG. 2 is a perspective view of a prior art container handling vehicle having a centrally arranged cavity for containing storage containers therein.
Figure 3:
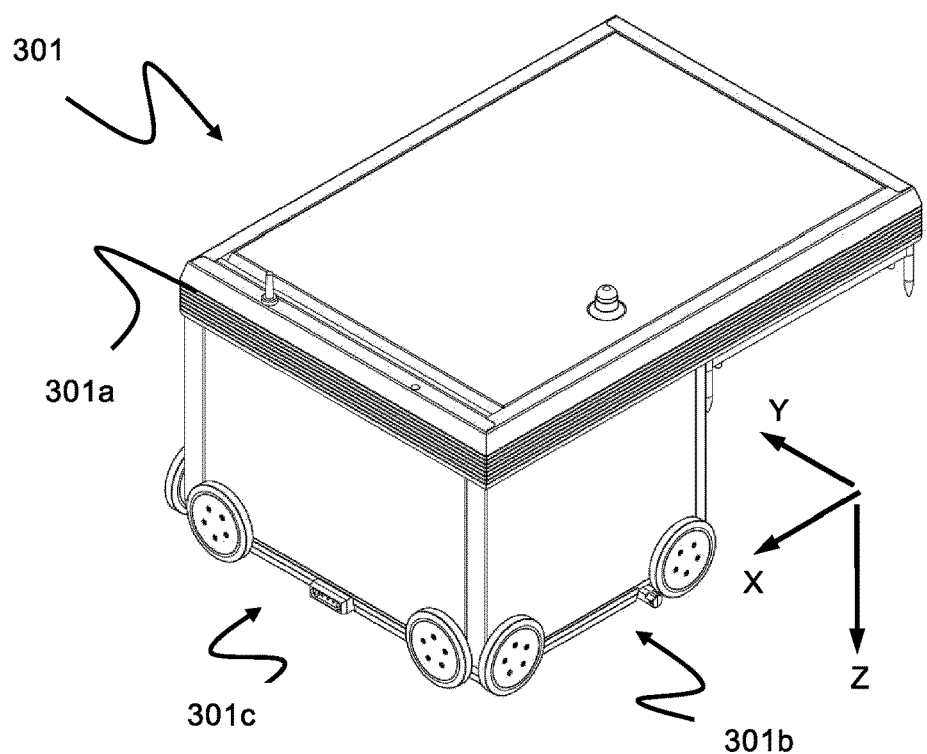
FIG. 3 is a perspective view of a prior art container handling vehicle having a cantilever for containing storage containers underneath.

In the following, embodiments of the invention will be discussed in more detail with reference to the appended drawings. It should be understood, however, that the drawings are not intended to limit the invention to the subject-matter depicted in the drawings.

Figure 4:
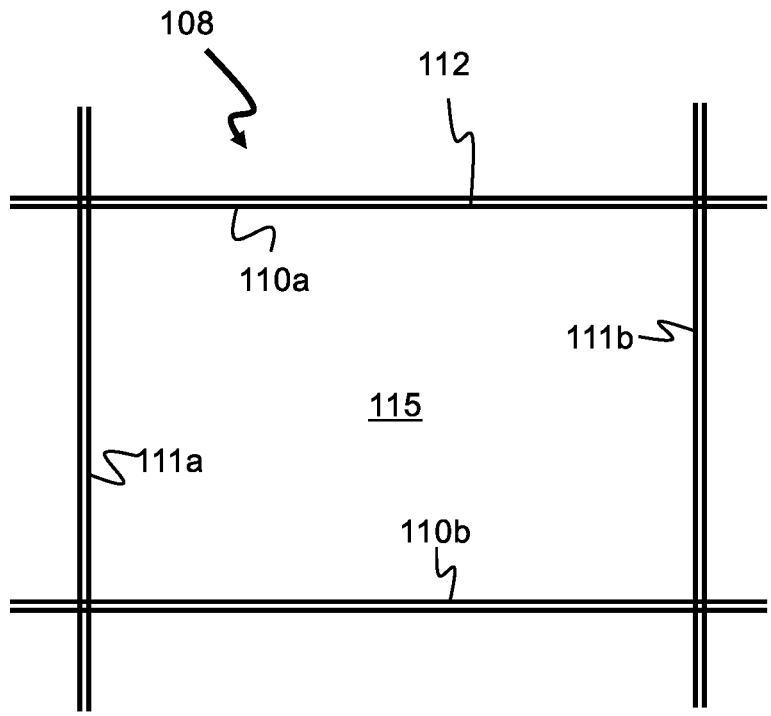
FIG. 4 is a top view of a prior art single rail system.

The framework 100 of the automated storage and retrieval system 1 is constructed in accordance with the prior art framework 100 described above in connection with FIGS. 1-6, i.e. a number of upright members 102 and a number of horizontal members 103, which are supported by the upright members 102, and further that the framework 100 comprises a rail system 108 of parallel tracks 110, 111 in X direction and Y direction arranged across the top of storage columns 105/grid columns 112. The horizontal area of a grid column 112, i.e. the area along the X and Y directions, may be defined by the distance between adjacent tracks 110 and 111, respectively (see FIGS. 4-6).

In FIG. 1 the grid 104 is shown with a height of eight cells. It is understood, however, that the grid 104 in principle can be of any size. In particular it is understood that grid 104 can be considerably wider and/or longer and/or deeper than disclosed in FIG. 1. For example, the grid 104 may have a horizontal extent of more than 700×700 grid cells and a depth of more than twelve grid cells.

One embodiment of the automated storage and retrieval system according to the invention will now be discussed in more detail with reference to FIGS. 7 to 12. The exact configuration of the container handling vehicle 3 shown in the figures may vary. However, all vehicles 3 of of the automated storage and retrieval system 1 comprise a vehicle body 17 and a wheel assembly 18 (or any other rolling means/rolling device) arranged in a lower section or part 17a (see FIG. 12) of the vehicle body 17 to enable the lateral movement of the container handling vehicle 3, i.e. the movement of the vehicle 3 in the X and Y directions (see FIGS. 7-8).

Figure 8:
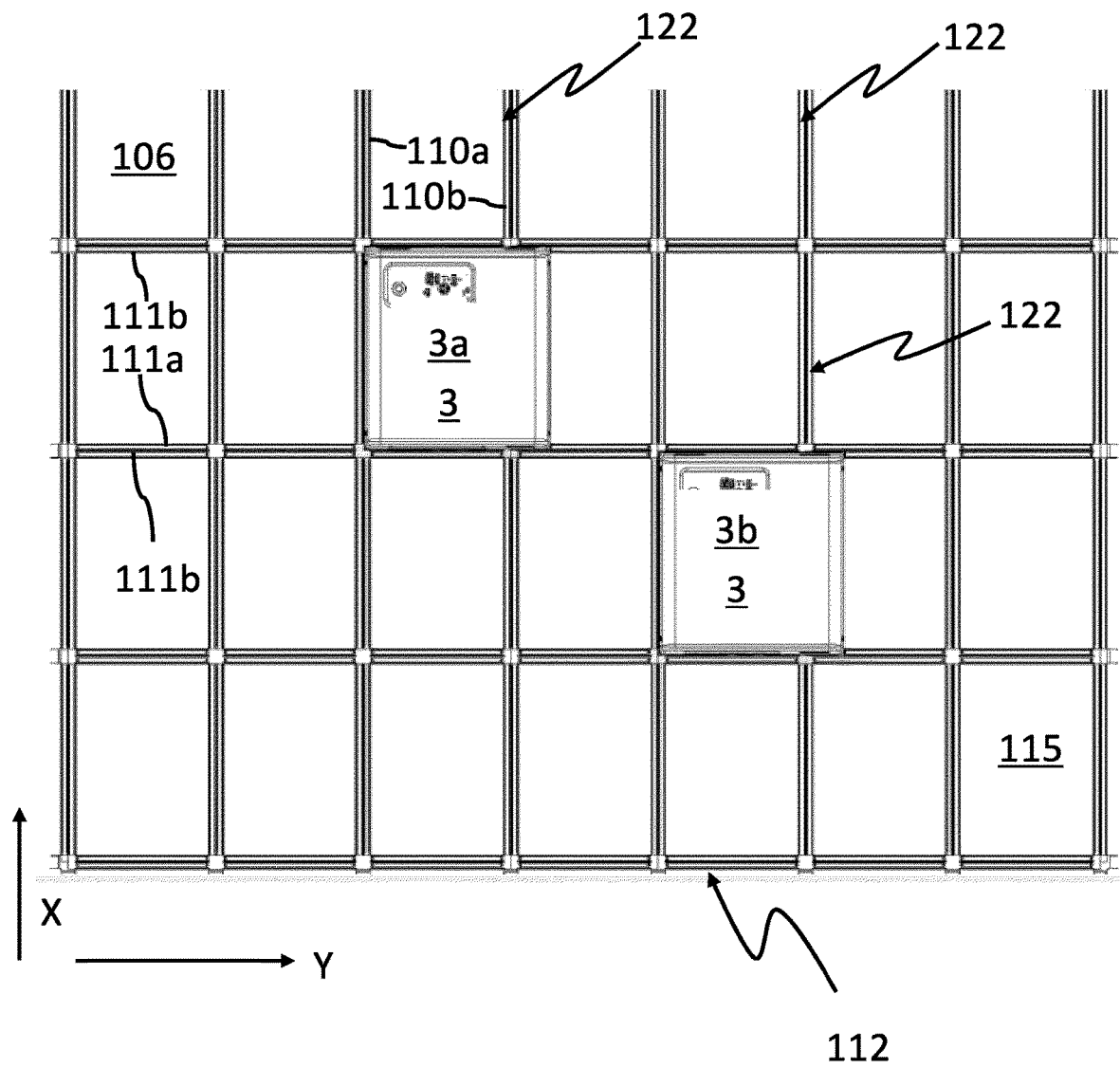
FIG. 8 is a top view of the automated storage and retrieval system of FIG. 7.
Figure 9:
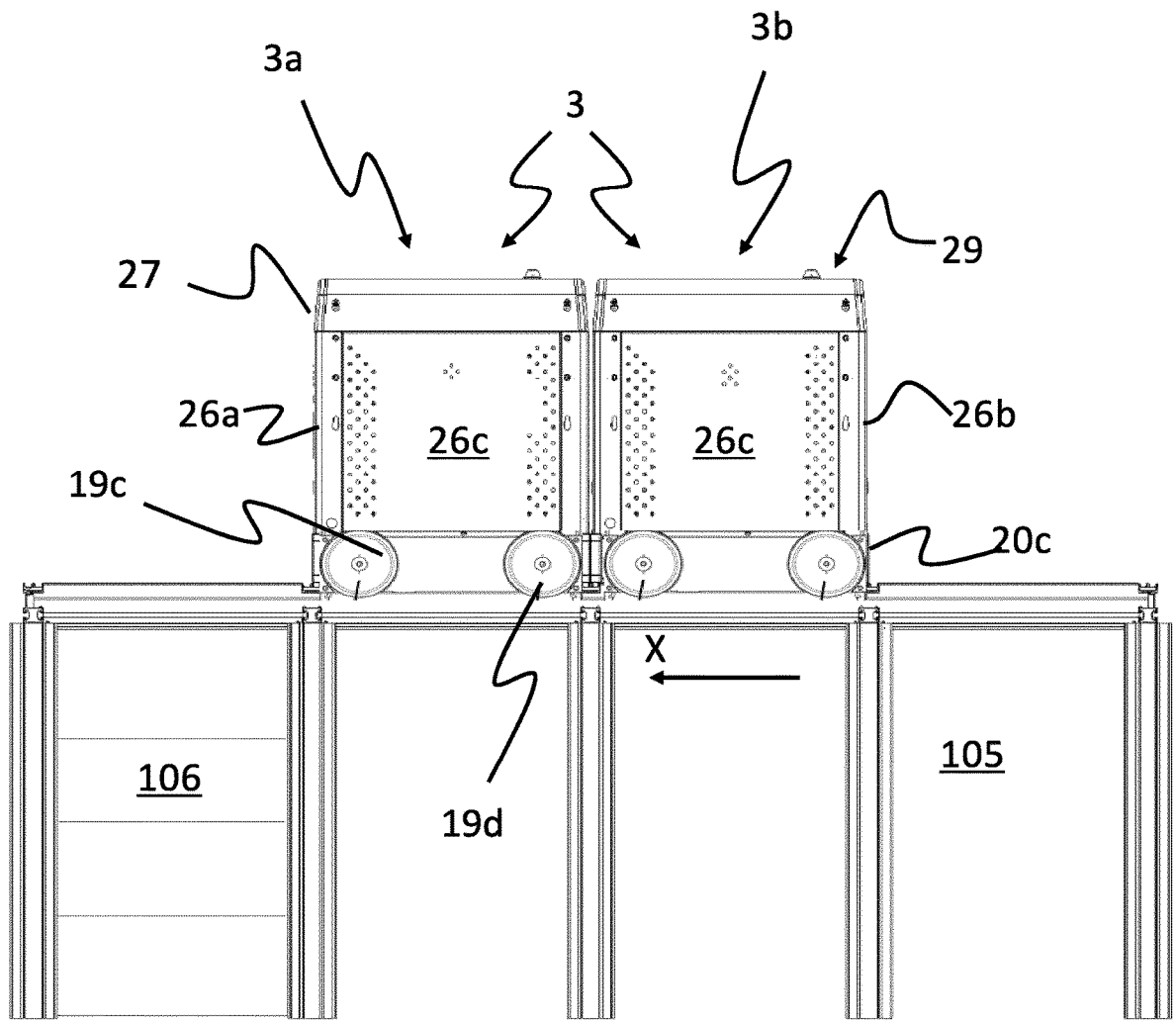
FIG. 9 is a side view of the automated storage and retrieval system according to FIGS. 7 and 8.
Figure 10:
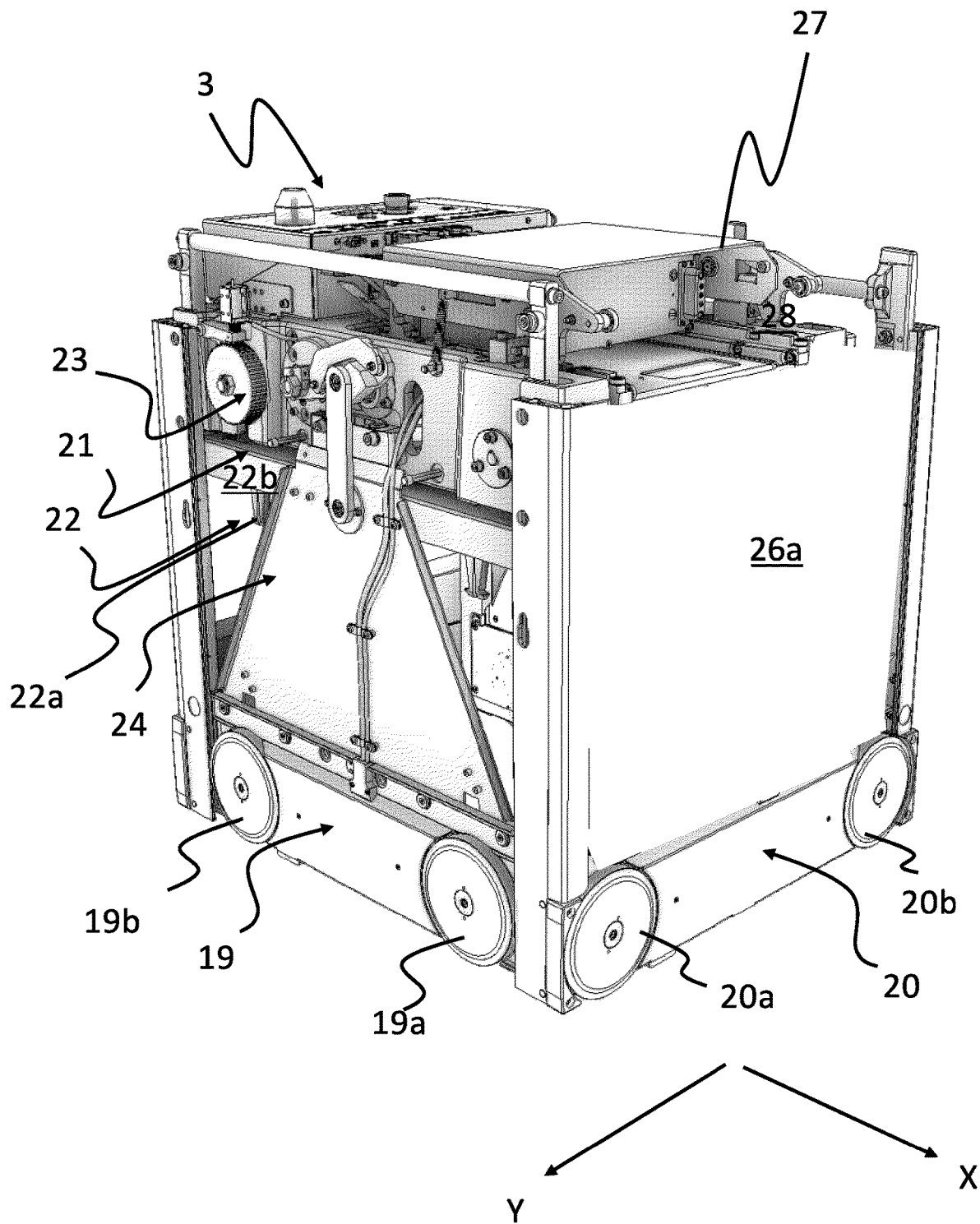
FIG. 10 is a perspective view of a container handling vehicle according to FIGS. 7 to 9, in which view a top cover and a side panel of the vehicle are removed.
Figure 11:
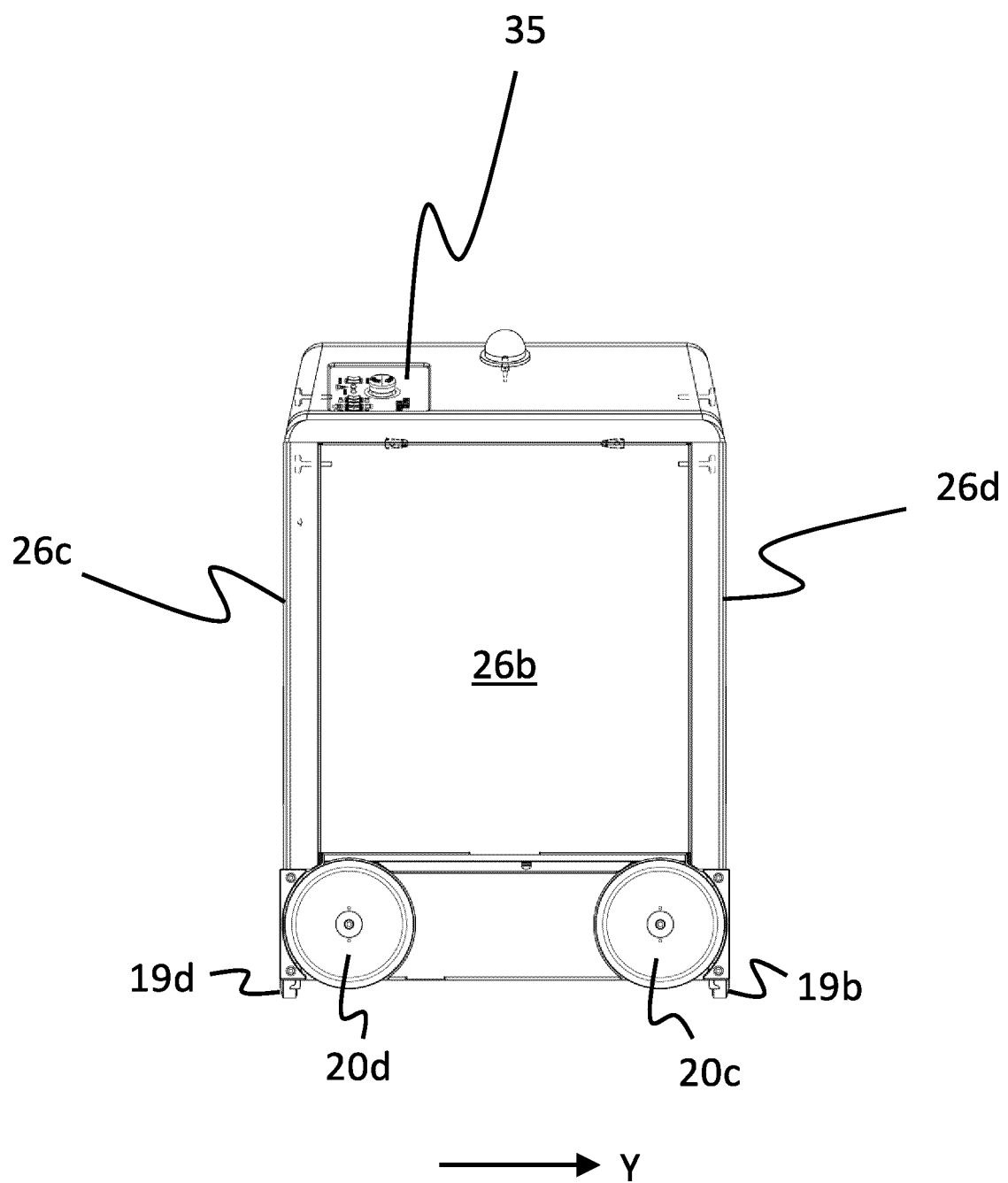
FIG. 11 is a side view of the container handling vehicle according to FIG. 10.
Figure 12:
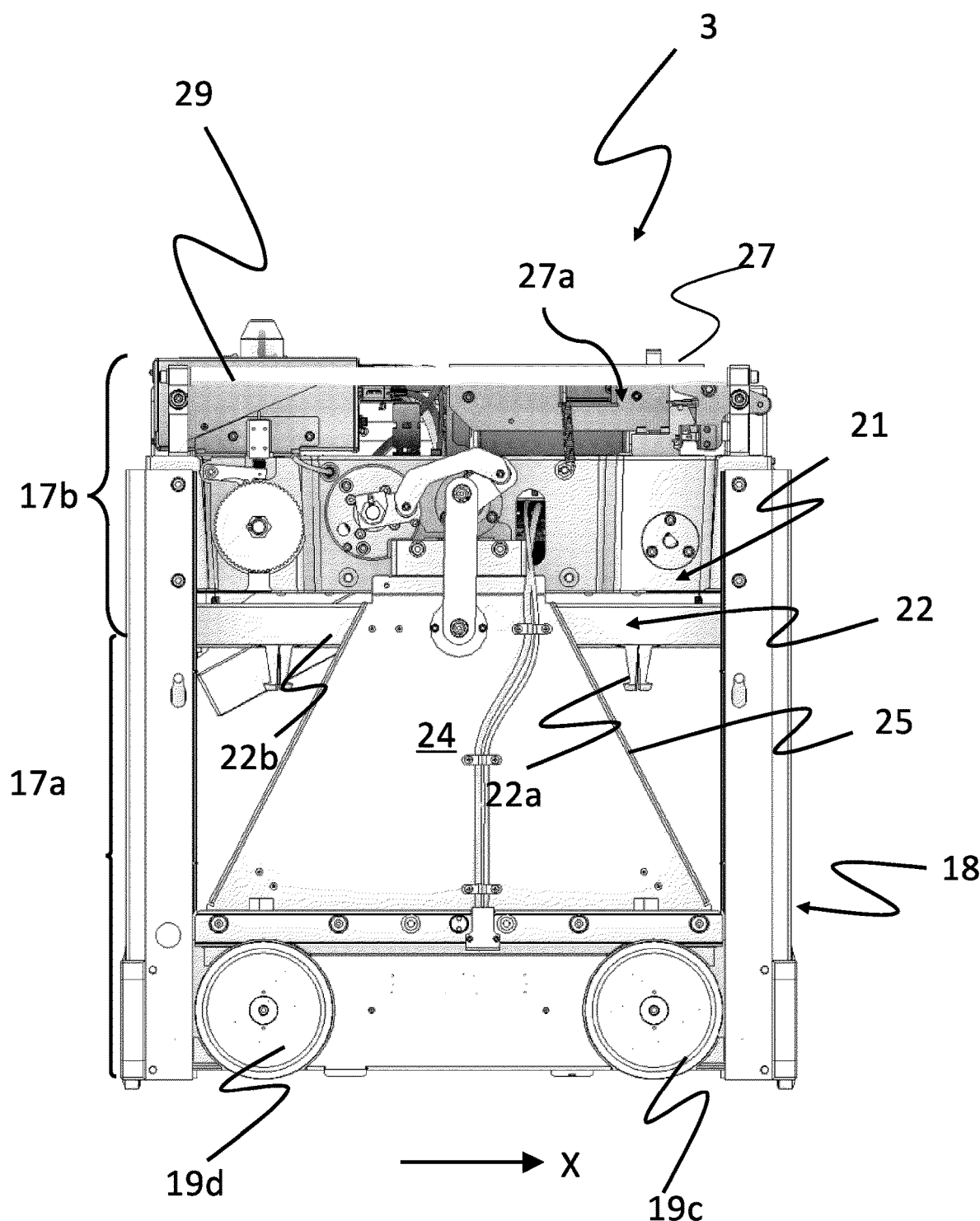
FIG. 12 is a cross-sectional side view of the container handling vehicle according to FIGS. 10 and 11.

The wheel assembly/rolling device 18 comprises a first set of wheels 19, which is arranged to engage with a pair of tracks 110a, 110b of the first set of tracks 110, and a second set of wheels 20, which is arranged to engage with a pair of tracks 111a, 111b of the second set of tracks 111 (see FIG. 8). At least one of the set of wheels 19, 20 can be lifted and lowered, so that the first set of wheels 19 and/or the second set of wheels 20 can be brought to engage with the respective set of tracks 110, 111 at any one time. The lifting/lowering procedure can for example be performed by lifting side plates 25 (see FIG. 12) attached to the respective wheels 19, 20 by use of a lifting motor arranged in the upper part 17b of the vehicle 3. Each set of wheels 19, 20 comprises four wheels 19a, 19b, 19c, 19d; 20a, 20b, 20c, 20d arranged along the sides of the vehicle 3. The wheels 19a and 19b are arranged in a first vertical plane, and the wheels 19c and 19d are arranged in a second vertical plane which is parallel to the first vertical plane and arranged at a distance from the first vertical plane which corresponds to the distance between tracks 110a and 110b (see e.g. FIG. 8). The wheels 20a and 20b are arranged in a third vertical plane, which is orthogonal to the vertical planes in which the wheels 19a, 19b, 19c and 19d are arranged, and the wheels 20c and 20d are arranged in a fourth vertical plane which is parallel to the third vertical plane and arranged at a distance from the third vertical plane which corresponds to the distance between the tracks 111a and 111b.

At least one of the wheels in each set 19, 20 is motorized in order to propel the vehicle 3 along the rail system 108. Advantageously, the at least one motorized wheel in each set 19, 20 comprises a hub motor, i.e. an electric motor that is coupled to, or incorporated into, the hub of a wheel and drives the wheel directly. An example of a container handling vehicle with such a motor is disclosed in WO2016/120075A1, the contents of which are incorporated herein by reference. Each container handling vehicle 3 comprises a storage compartment or bin storage space 24 arranged within the lower part 17a of the vehicle body 17 (see FIG. 12) for receiving and holding a storage container 106 when transporting the storage container 106 across the rail system 108 (see FIG. 8). The bin storage space 24 can be accessed from below, i.e. from an opening at the bottom of the container handling vehicle 3. In the particular vehicle configuration shown in FIGS. 7-16, the bin storage space 24 is arranged centrally or substantially centrally within the vehicle body 17.

Each container handling vehicle 3 also comprises a lifting device 21 (see FIGS. 10 and 12) for vertical transportation of a storage container 106, e.g. lifting a storage container 106 from a storage column 105 and bringing it into the bin storage space 24, and also for lowering a storage container 106 from the storage space 24 into a storage column 105. The lifting device 21 comprises a gripping device 22 which is arranged to releasably engage with a storage container 106. The lifting device 21 also comprises a motorized lifting mechanism 23 for lowering and raising the gripping device 22 so that the position of the gripping device 22 with respect to the vehicle body 17 can be adjusted in a third direction Z, i.e. orthogonal the first direction X and the second direction Y (see also FIG. 7). In the vehicle configuration illustrated in FIGS. 10 and 12 the gripping device 22 comprises remotely operated claws 22a attached underneath a lifting plate 22b. The lifting plate 22b may be connected to a plurality belts (not shown) constituting part of the motorized lifting mechanism 23.

The motorized lifting mechanism 23 is arranged in the upper part 17b of the vehicle body 17 (see FIG. 12), below a battery cover or house 27 for mounting of a chargeable power supply 28 (see FIG. 10) and above the lower part 17a with the bin storage space 24.

When a storage container 106 stored in the storage grid 104 is to be accessed, one of the container handling vehicles 3 is instructed to retrieve the target storage container 106 from its position in the storage grid 104 and to transport the target storage container 106 to an access station (not shown) where it can be access from outside of the storage grid 104 or transferred out of the storage grid 104. This operation involves moving the container handling vehicle 3 to the grid cell 122 above the storage column 105 in which the target storage container 106 is positioned and retrieving the storage container 106 from the storage column 105 using the container handling vehicle's lifting device 21. The lifting device 21 lifts the storage container 106 from the storage column 105 through the grid opening 115 of the grid cell 122 and into the storage space 24 of the vehicle 3.

If the target storage container 106 is located deep within a stack 107 (shown in FIG. 1), i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 3 that is subsequently used for transporting the target storage container 106 to the access station, or with one or a plurality of other cooperating container handling vehicles 3. Alternatively, or in addition, the automated storage and retrieval system 1 may have container handling vehicles specifically dedicated to the task of temporarily removing storage containers from a storage column 105, for example the multi-container handling vehicle 5 shown in FIG. 19. Once the target storage container 106 has been removed from the storage column 105, the temporarily removed storage containers can be repositioned into the original storage column 105. The removed storage containers may alternatively, or in addition, be relocated to other storage columns.

Once the target storage container 106 has been brought into the storage space 24 of the container handling vehicle 3, the vehicle 3 transports the storage container 106 to the access station where it is unloaded. The access station may typically comprise a grid location at the periphery of the storage grid 104 where the storage container 106 can be accessed manually or transported further using a suitable conveyor system (not shown).

When a storage container 106 is to be stored in the storage grid 104, one of the container handling vehicles 3 is instructed to pick up the storage container 106 from a pick-up station (not shown), which may also double as an access station, and transport it to a grid cell 122 above the storage column 105 where it is to be stored. After any storage containers positioned at or above the target position within the storage column stack 107 have been removed, the container handling vehicle 3 positions the storage container 106 at the desired position. The removed storage containers may then be lowered back into the storage column 105 or relocated to other storage columns within the storage grid 104.

For monitoring and controlling the automated storage and retrieval system 1 so that a desired storage container 106 can be delivered to the desired location at the desired time without the container handling vehicles 3 colliding with each other, the automated storage and retrieval system 1 comprises a control system, which typically is computerised and comprises a database for monitoring and controlling e.g. the location of the respective storage containers 106 within the storage grid 104, the content of each storage container 106 and the movement of the container handling vehicles 3. Each vehicle 3 should thus be equipped with onboard control and communication system 35 comprising suitable transmission and receiving means (i.e. a transmitter-receiver system) to enable transmission and receival of signals from and to the remotely situated control system. The container handling vehicles 3 typically communicates with the control system via wireless communication means, e.g. via a WLAN operating under an IEEE 802.11 (WiFi) standard and/or utilising a mobile telecommunication technology such as 4G or higher.

Each container handling vehicle 3 comprises a power supply 28 (i.e. a replaceable power supply) which provides power to onboard equipment, including the motorised rolling device 18, the motorised lifting mechanism 23 and the onboard control and communications systems 35.

Each of the container handling vehicles 3 shown in FIGS. 7-12 and FIGS. 14-16 has a footprint, i.e. a contact area against the rail system 108, which has a horizontal extension or area which is equal to or less than the horizontal area of a grid cell 122. In other words, when the vehicle 3 is positioned above a grid cell 122, e.g. for lifting a storage container 106 from or lowering a container 106 into a storage column 105, the footprint of the vehicle 3 will not extend beyond the grid cell 122 into a neighbouring grid cell 122. The wheels 19a-19d, 20a-20d are arranged around the periphery of the bin storage space 24, and the footprint of the vehicle 3 is larger than the storage space 24 only enough to accommodate the wheels 19a-19d, 20a-20d. In this way, the footprint of the vehicle 3 takes up the minimum possible amount of space in the X-Y plane. Since the bin storage space 24 is positioned between the pair of wheels, i.e. the pairs 19a and 19b, 19c and 19d, 20a and 20b and 20c and 20d, the centre of gravity of the vehicle 3 will be located within the footprint 30 also when a storage bin 106 is raised into the storage space 24. Further, the vehicle 3 comprises generally vertical side walls 26a-26d (see FIGS. 7, 9-11 and 14-16), which are co-planar to the vertical planes in which the wheels 19a-19d; 20a-20d are arranged. Consequently, the lower part of the container handling vehicle 3 has a generally cuboid shape.

By arranging the battery cover 27 and the power supply 28 fully above the bin storage space 24, within the upper part 17b, the power supply 28 may be placed deeper into the vehicle 3 without causing a significant reduction in the available storage space for the bin 106. In addition to enable the use of larger power supplies/batteries 28, a deeper arrangement of the batteries compared to the prior art solutions where the batteries are arranged at the vehicles' side walls, increases the overall stability conditions for the vehicle 3. The term 'deeper" is herein defined relative to the outermost perimeter of the vehicle 3 in the X-Y directions, that is, in a lateral direction towards the vertical axis going through the vehicle's 3 centre of gravity.

Figure 5:
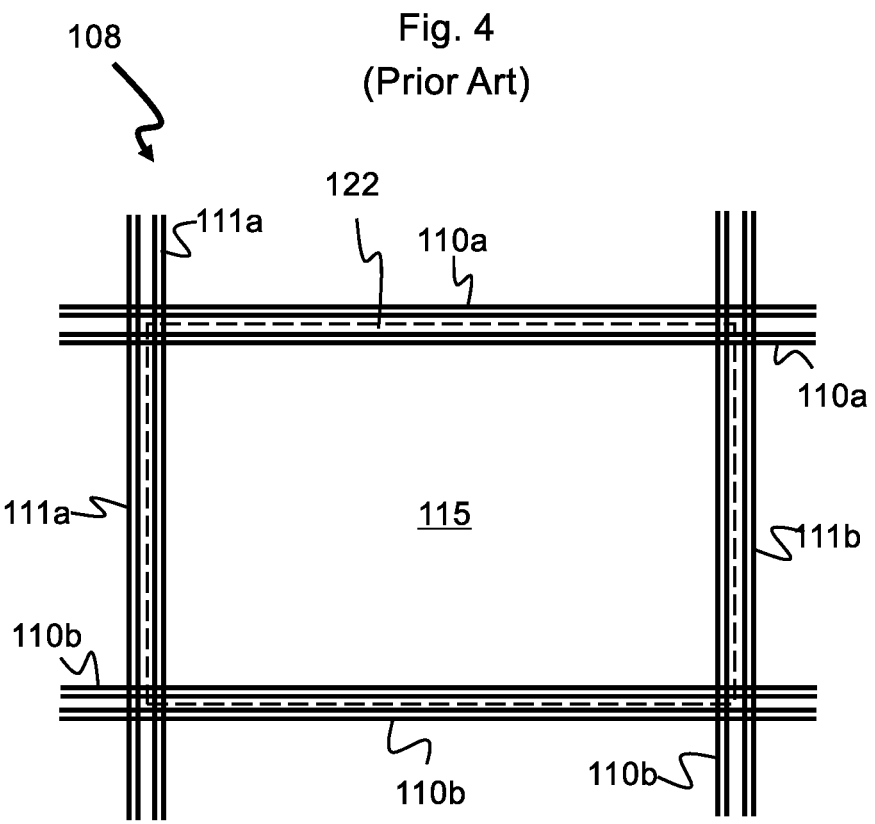
FIG. 5 is a top view of a prior art double rail system.
Figure 6:
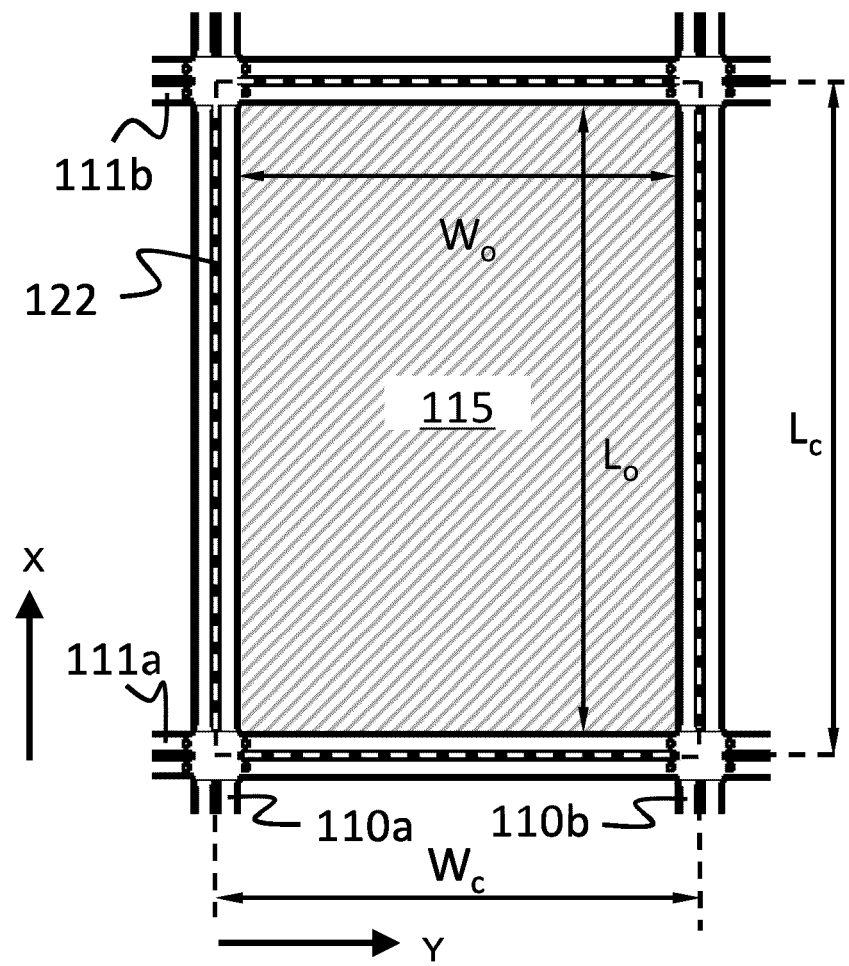
FIG. 6 is a top view of a track system of the automated storage and retrieval system according to FIG. 1.
Figure 7:
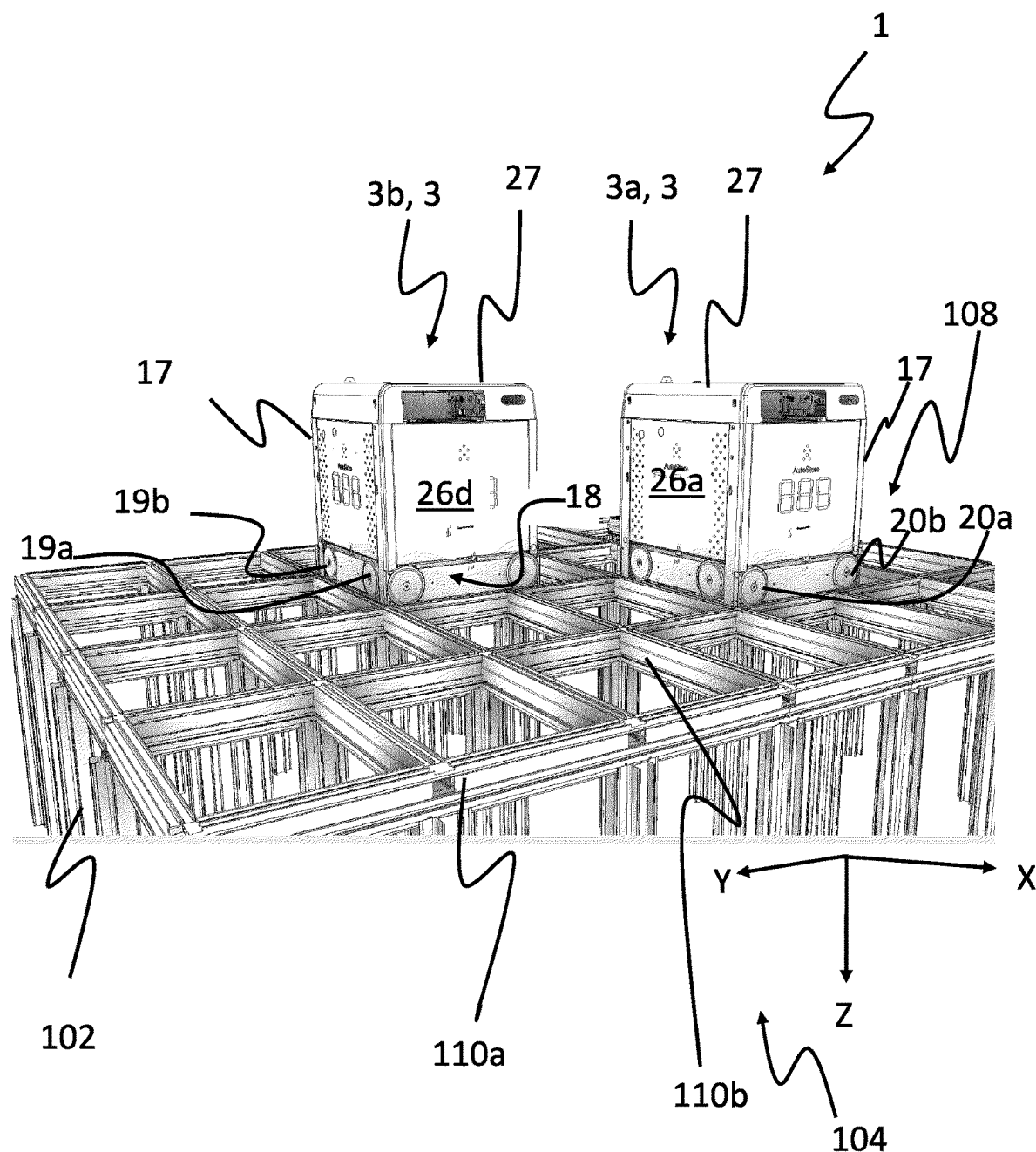
FIG. 7 is a perspective view of an automated storage and retrieval system comprising two container handling vehicles according to one exemplary embodiment of the invention.

In the rail system 108 shown in FIGS. 5 and 8, each horizontal member making up the track system comprises two tracks. Consequently, each horizontal member is capable of accommodating two or more wheels in parallel. In such a rail system 108, the borders between neighbouring grid cells 122 run along the centre-line of the horizontal members, as is indicated in FIG. 5.

Figure 13:
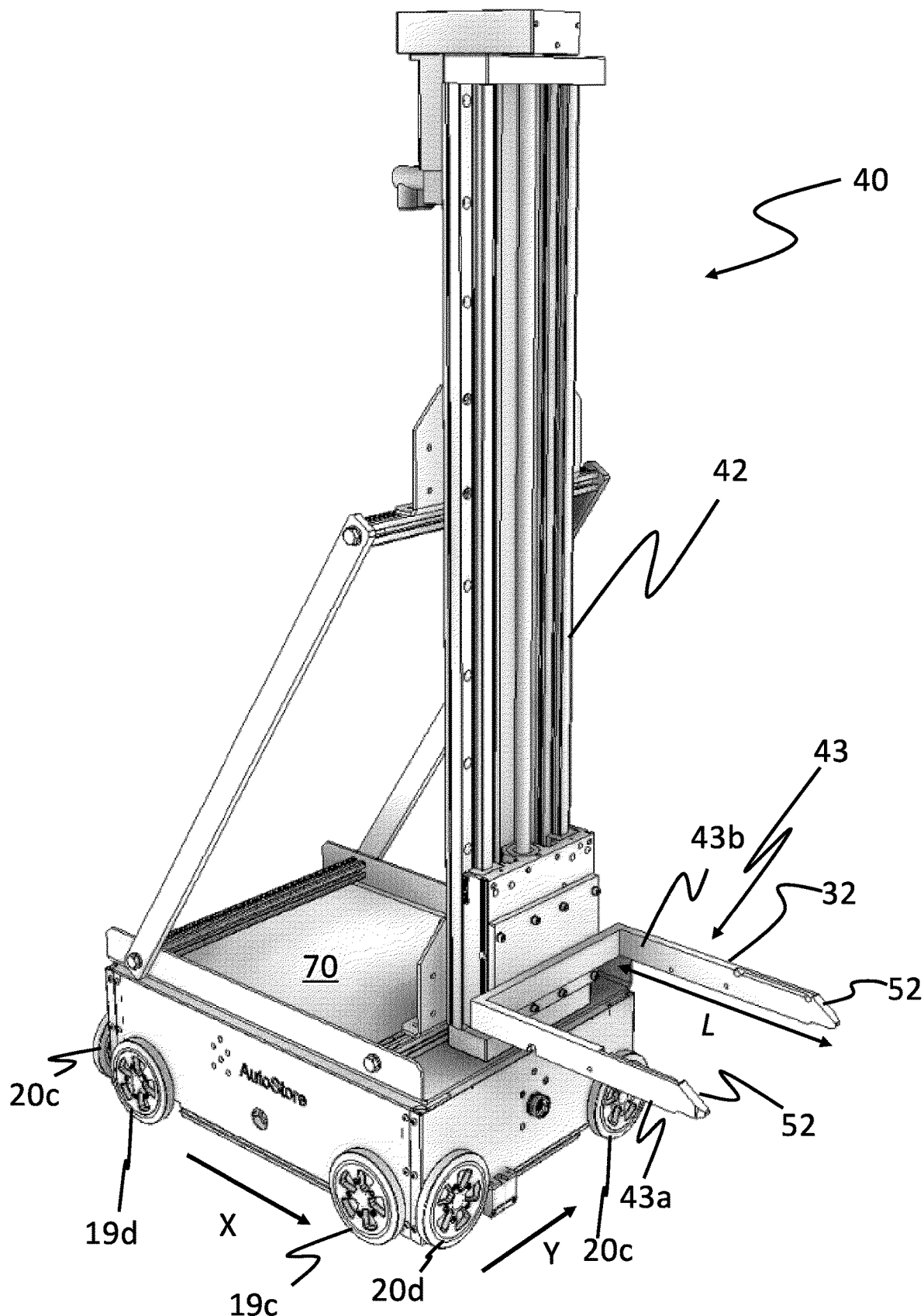
FIG. 13 shows an automated loader which can be used in transferring power supply between container handling vehicle and a charging position in a charging rack.

FIG. 13 shows an automated loader 40 which can be used in transferring power supply between a container handling vehicle and a charging position in a charging rack.

An automated storage and retrieval system 1 as described herein may comprise a plurality of such automated loaders 40. The automated loader 40 is arranged to move horizontally by first and second sets of wheels 19a-d, 20a-d arranged on the base 40. The operation of the first and second sets of wheels of the automated loader 40 to drive in the X and Y directions are preferably similar to the operation of the first and second wheels of the container handling vehicles and its operation will not be repeated. A mainly vertical column 42 extends upwardly from the base, along which column 42 a power supply support 43 may travel in a vertical direction. The combination of the first and second sets of wheels and the vertical column 42 provide for the possibility of moving the power supply support 43 of the automated loader 40 in the XYZ directions (i.e. both vertical and horizontal movement). This manoeuvrability ease the replacement of power supplies 28 between the power supply compartment 27a of the container handling vehicles 3-5 and the charging rack by retrieving a replaceable power supply 28 from and inserting a replaceable power supply 28 into a charging position of the charging rack and by retrieving a replaceable power supply from and inserting a replaceable power supply into the power supply compartment 27a of the container handling vehicle by the automated loader extending into said charging rack 40 and power supply compartment 27a.

Moreover, the power supply support 43 may comprise two guiding pins (i.e. guiding arms) 43a, 43b extending a distance L from an outer perimeter of the column 42. The size of the base 70 is preferably similar to the size of a grid cell of an underlying rail system 108.

Figure 14A:
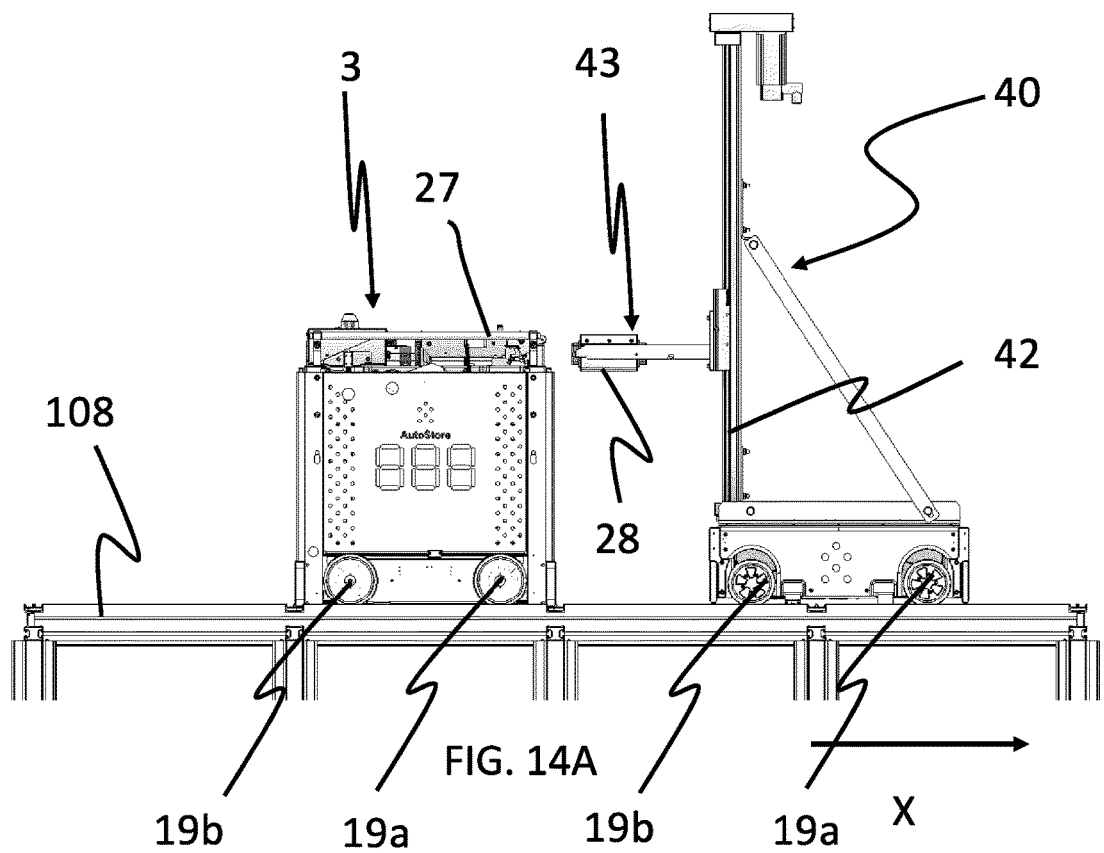
FIGS. 14A-E show in sequence a power storage source being transferred from the automated loader to a power storage source compartment of the vehicle.
Figure 14B:
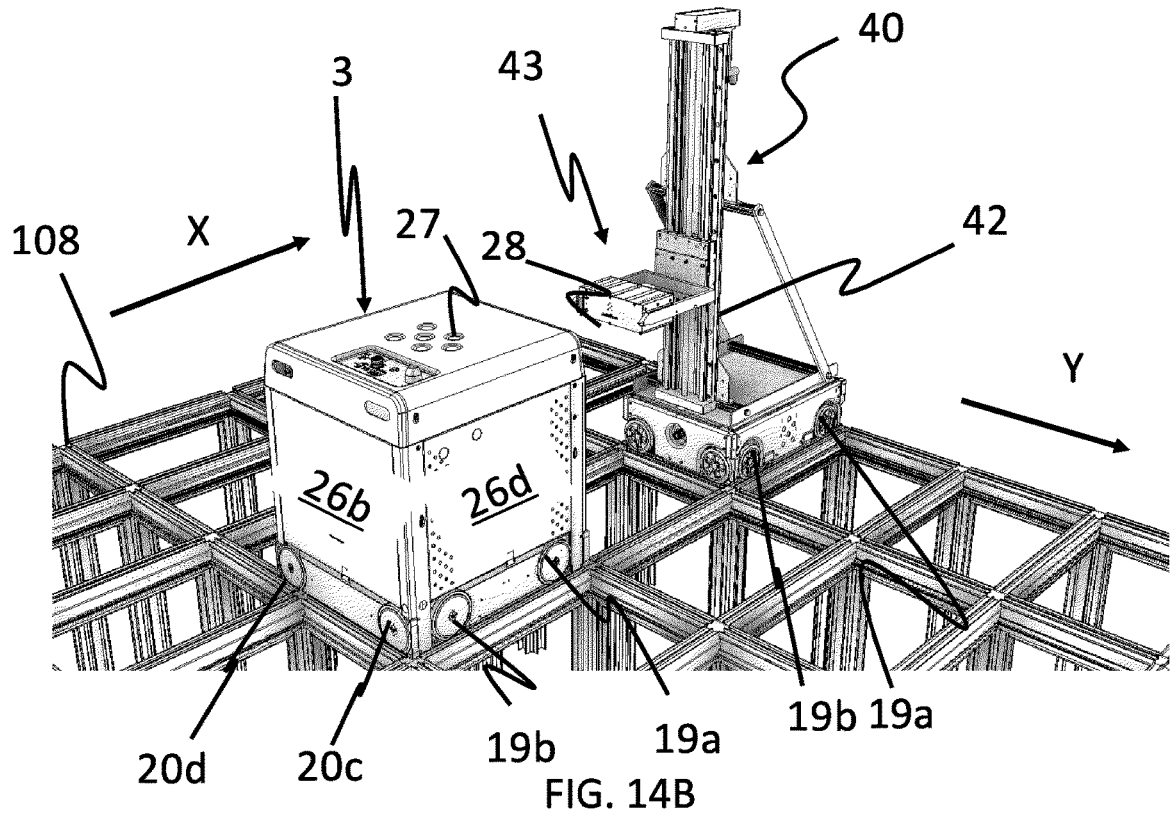
Figure 14C:
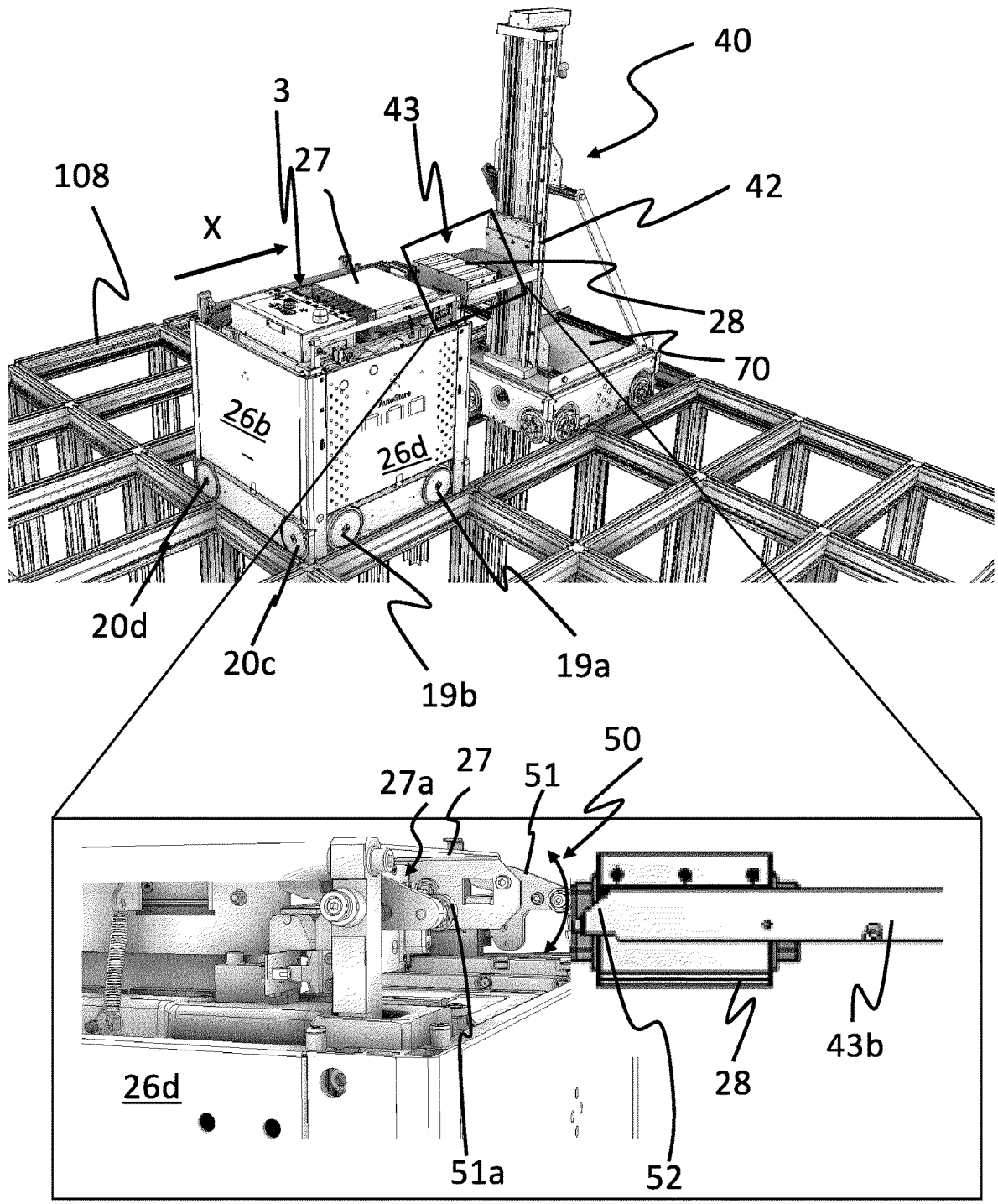
Figure 14D:
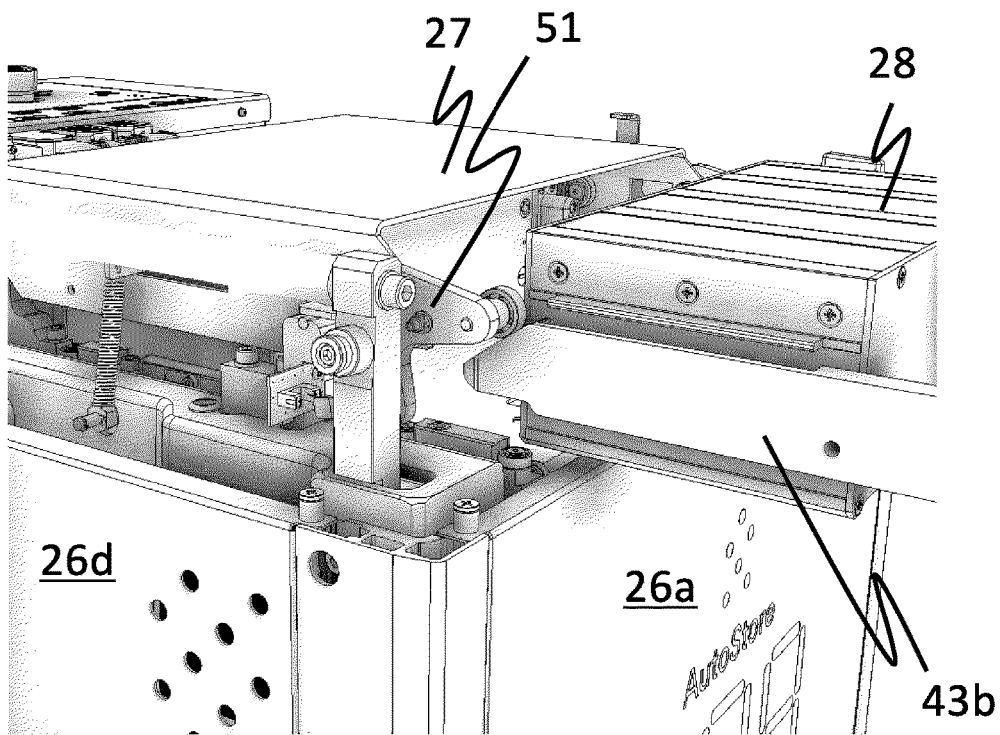
Figure 14E:
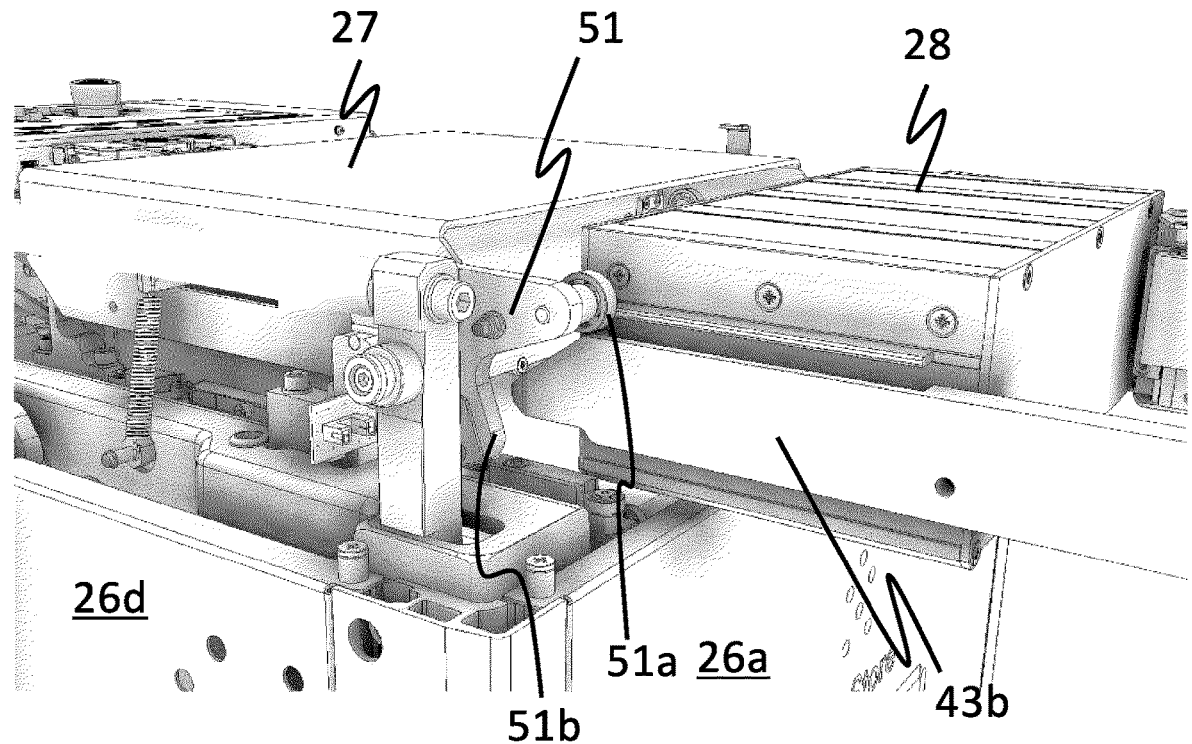
Figure 15:
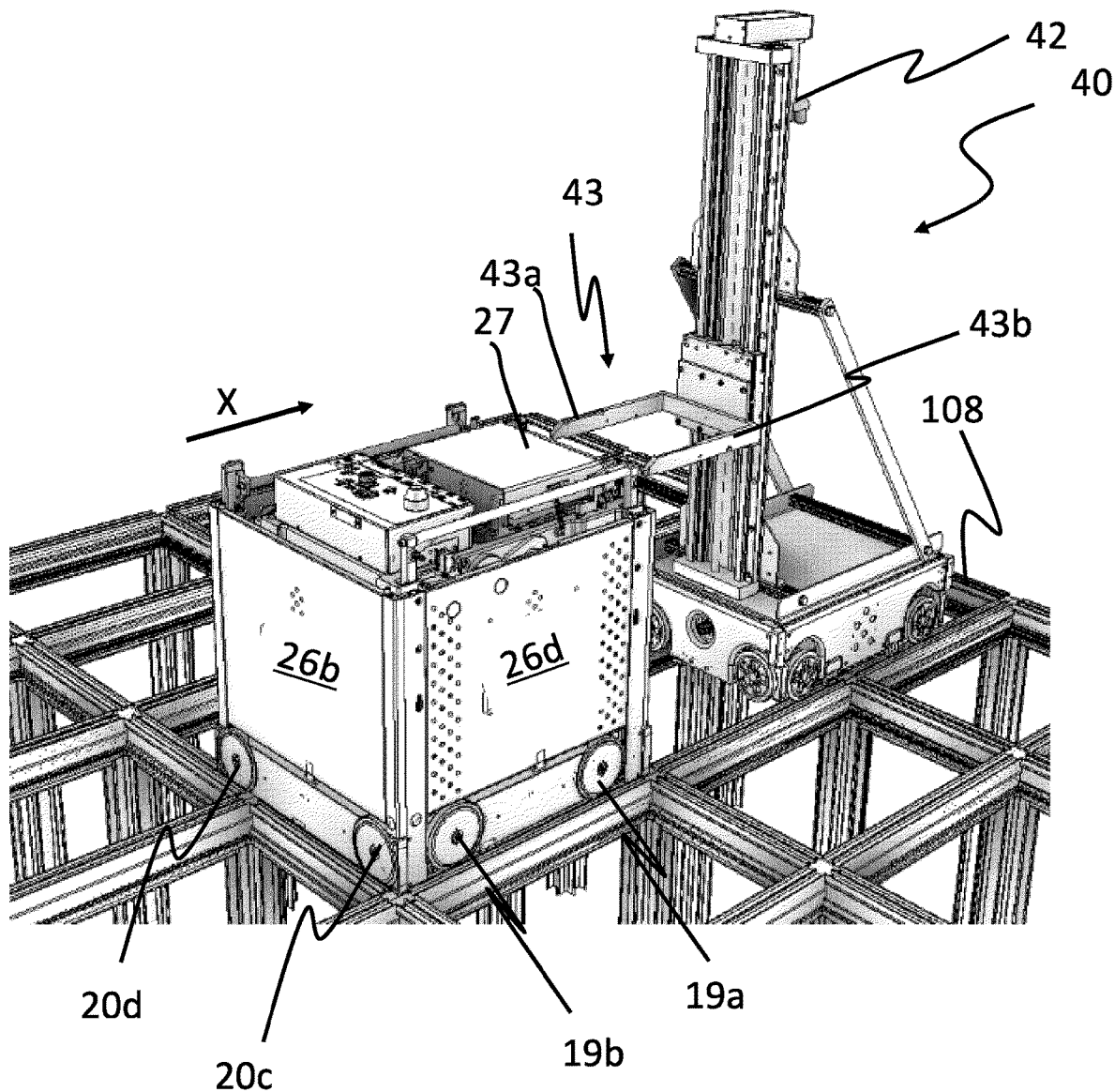
FIG. 15 is a side view of an exemplary automated storage and retrieval system showing one example of a sequence for inserting a charging station mounted power storage source into the power storage source compartment of the vehicle.
Figure 16:
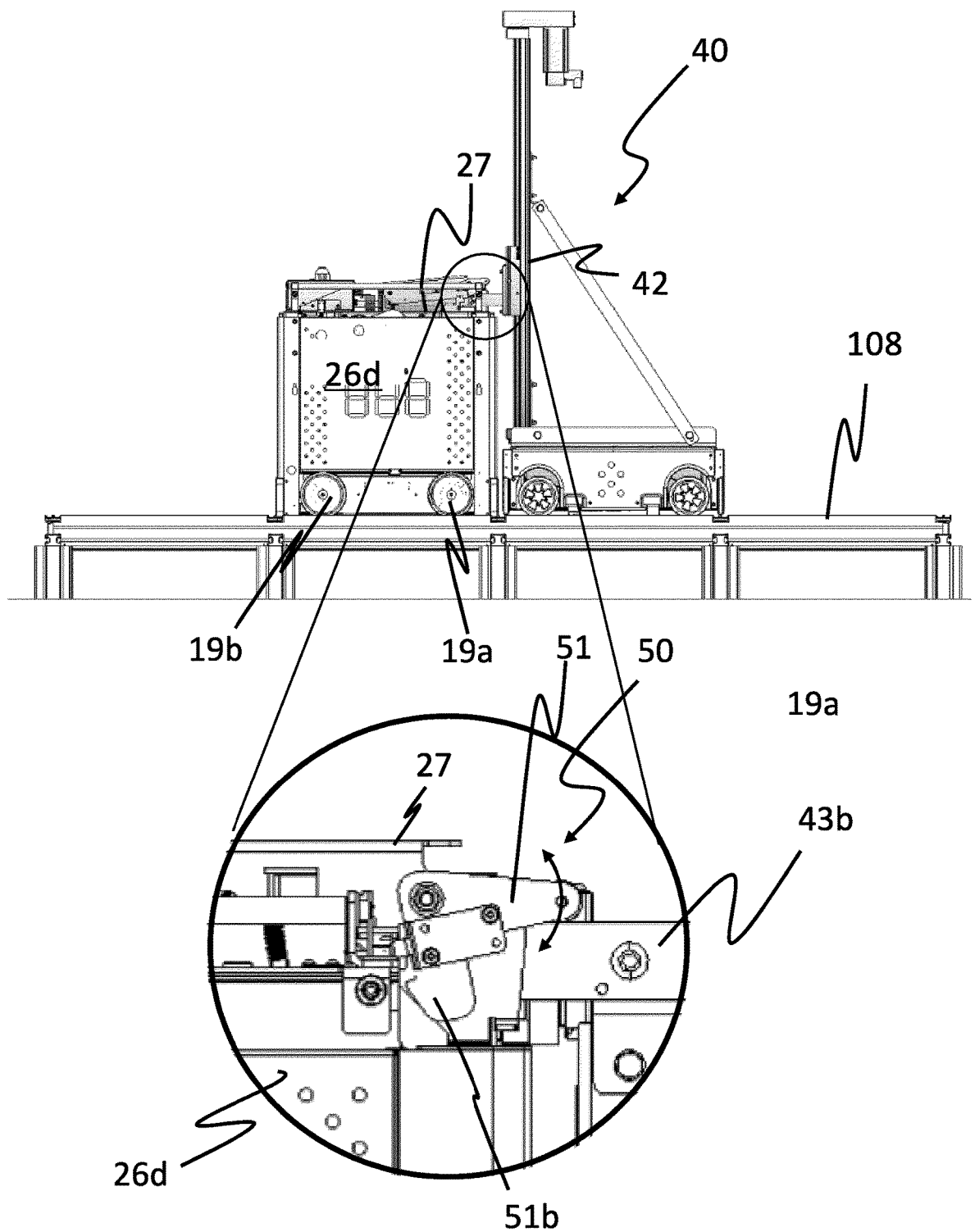
FIG. 16 is a side view of a container handling vehicle releasably connected to an automated loader in accordance with one embodiment of the invention.

One possible power supply/battery exchange process will now be described with particular reference to FIGS. 14A-E, FIG. 15 and FIG. 16, where FIGS. 14A-E show in sequence a power storage source being transferred from the automated loader to a power storage source compartment of the vehicle, FIG. 15 is a side view of an exemplary automated storage and retrieval system showing one example of a sequence for inserting a charging station mounted power storage source into the power storage source compartment of the vehicle, and FIG. 16 is a side view of a container handling vehicle releasably connected to an automated loader in accordance with one embodiment of the invention.

Referring to FIG. 14A, the automated loader 40 has discarded the replaceable power source 28 from the power supply compartment 27a of the container vehicle 3. The replaceable power source 28 is carried by the power supply support 43 of the automated loader 40.

Comparing FIG. 14B with 14A, one can see that in FIG. 14B the container handling vehicle 3 stands at rest in the same cell as in FIG. 14A, while the automated loader 40 has moved away from the container handling vehicle 3. The movement of the automated loader 40 is rendered possible by operating the wheels 19a-19d in the X direction on the rail system 108.

In order to provide stable discard/retrieval and insert operations of the power supply 28 out from and into the power supply compartment 27a, as well as correctly align the replaceable power supply 28 during exchanging operations, all wheels 19a-19d, 20a-20d of the container handling vehicle 3 are preferably in contact with the underlying rail system 108 during these operations. Typical vertical displacement of the vehicle 3 is 5-15 mm, for example 10 mm.

Referring to FIG. 14C, the automated loader 40 has picked up a charged power supply 28, which power supply 28 is about to enter the power supply compartment 27a of the container handling vehicle 3. The charged power supply 28 is mounted/carried on the power supply support 43, which in the example shown is in form of two guiding pins 43a, 43b (i.e. guiding arms) extending laterally/horizontally away from the base 70 of the automated loader 40.

When the automated loader 40 is contacting the vehicle 3 (see FIG. 14C), a release mechanism 50 (i.e. a releasable locking mechanism) is activated, allowing the battery cover 27 to be tilted around a rotational Y axis.

In the example shown in FIG. 14C, the release mechanism 50 comprises a pivot arm 51 arranged at each side of the opening of the power supply compartment 27a into which the replaceable power supply 28 is about to enter.

Further, each of the protruding ends of the guiding pins 43a, 43b (constituting the power supply support 43) displays a tapered section 52. Upon contact between the pivot arm 51 and the guiding pins 43a, 43b, a pivot arm contact element 51a of each pivot arm 51 is pushed towards the tapered section 52, thereby enforcing an upward directed pivoting movement of the pivot arm 51 (see FIGS. 14C, 14D, 14E). This pivot movements releases a security lock 51b (see FIGS. 14E and 16) allowing the above-mentioned tilt of the battery cover 27.

The operation of the release mechanism 50 is illustrated in each of the sequence drawings in FIGS. 14A-E. To increase clarity, enlarged area drawings of the release mechanism 50 is added in FIG. 14C and FIG. 16. The enlarged area drawings clearly show the activation of the pivot arm movement upon contact with the tapered section 52 moving the security lock 51b away from the battery cover 27 and the subsequent entry of the power supply 28.

Figure 18:
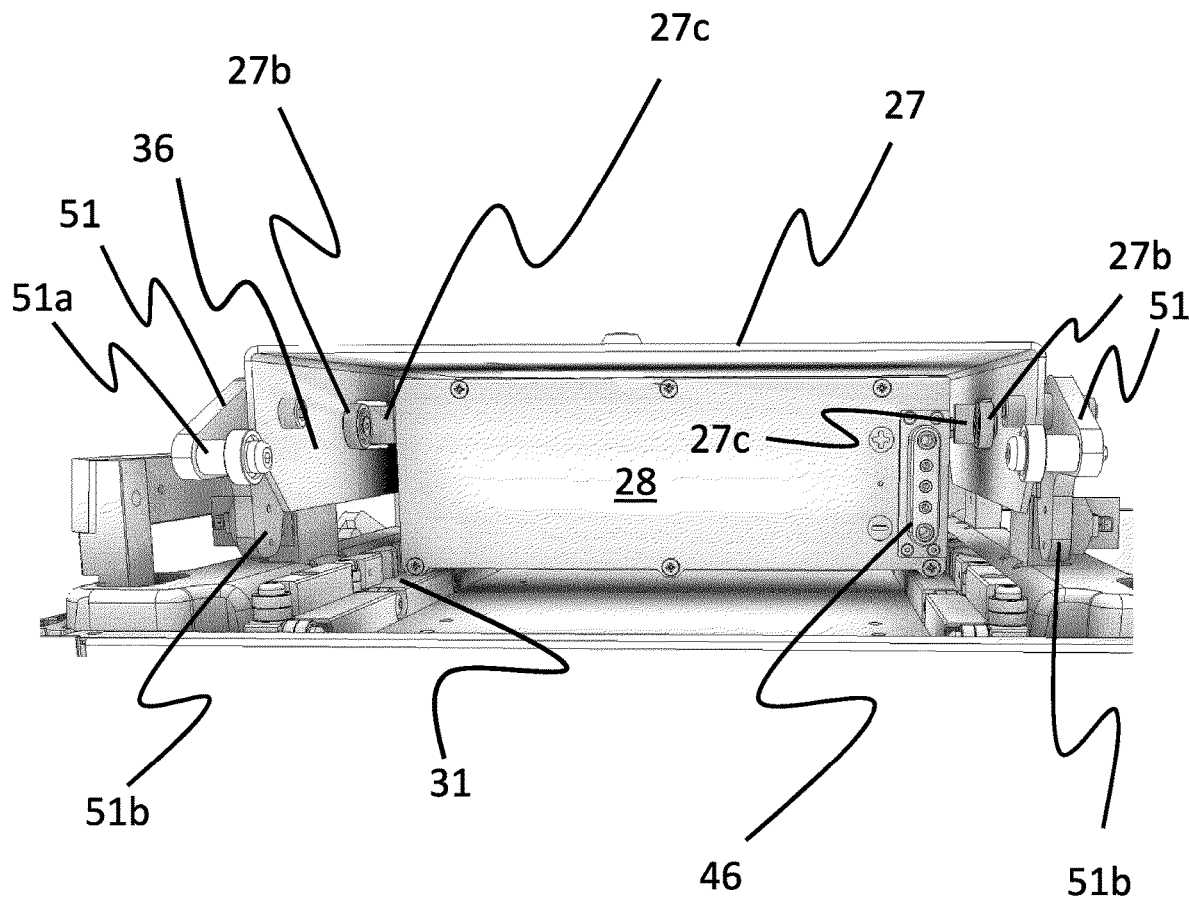
FIG. 18 is a cross sectional view along the X direction of the chargeable power storage source of FIG. 17 arranged in operative position within a power supply compartment of a container handling vehicle.

When the guiding pins 43a, 43b with the attached power supply 28 has entered a certain distance into the power supply compartment 27a, the guiding pins 43 releases a battery lock 27b, 27c that allows further entry until the power supply 28 is fully in its end position within the power supply compartment 27a (see FIG. 18).

In FIG. 18, the battery lock 27b, c (i.e. a power supply locking assembly) comprises a battery lock activator in the form of a wheel 27b and one or more blocking teeth 27c extending from the inner walls of the battery cover 27 (i.e. from the sidewalls 36 of the power supply locking assembly) and into the power supply compartment 27a. When the tapered ends 52 of the guiding pins 43a, b contact the wheel 27b, the battery cover 27 is tilted upwards, thereby displacing the one or more teeth 27c such that the power supply 28 and the guiding pins 43a, b may continue the movement deeper into the power supply compartment 27a. It is noted that the main function of the battery cover 27 is to act as a constructional element of the battery lock, providing rigidity to the two side walls on which the blocking teeth and the wheel is arranged. Thus, in other embodiments the battery cover may be any element able to provide adequate support/rigidity to the two side walls (or longitudinal elements) on which the blocking teeth and the wheel is arranged.

When the power supply 28 is in its end position inside the battery cover 27 and in electrical contact with the corresponding electrical connector of the vehicle 3, the battery cover 27 tilts back to its initial position such that the teeth 27c physically lock or hold the power supply 28 within the power supply compartment 27a. As an example, the teeth 27c may enter dedicated recesses 49a within support rails 49 arranged at both sides of the power supply 28 (see FIG. 17).

The battery lock 27b, c may be any physical hindrance within the power supply compartment 27a. As an alternative to the above-mentioned teeth 27c, the battery lock may comprise one or more protruding wedges, pawls or cathces that the power supply 28 may surpass in one direction, but not in the other. In this configuration, the wedge shape would act as the battery lock activator 27b.

When the power supply 28 is in its end position and successfully locked into the power supply compartment 27a by the battery lock 27b, c, the power supply support 43 of the automated loader 40 is lowered relative the vehicle 3, thereby power supply 28 is hung off in the power supply compartment 27a and released from the engagement with the guiding pins 43a, 43b. The power supply exchange operation is then complete and the container handling vehicle 3 can continue with its normal tasks. The guiding pins 43a, 43b of automated loader 40 are then moved out of the power supply compartment 27a either by moving the automated loader 40 or by moving the container handling vehicle 3. Instead of raising the power supply support 43 to release the power supply 28, it is possible to raise the wheels of the container handling vehicle to provide the relative movement of the power supply support 43 and the power supply compartment 27a.

Since now the battery lock 27b, c is locking the power supply 28 into the power supply compartment 27a, and the power supply 28 has been lifted free from the power supply support 43, a relative movement of the container handling vehicle 3 away from the automated loader 40 leaves the power supply 28 electrically connected to the vehicle 3.

In addition to allowing successful exchange of power supply 28, the blocking of the power supply 28 into the power supply compartment 27a has the advantage that the power supply 28 cannot be unintentionally displaced within the battery cover 27 during operation.

When the control system has sent an instruction to the automated loader 40 that the vehicle 3 is in need of a power supply 28 exchange, the steps for transferring the power supply 28 from the vehicle 3 to the charging station rack 40 are essentially equal or similar to the opposite sequence and direction of the above-mentioned steps of transferring the power supply 28 from the charging station rack 40 to the vehicle 3 using the automated loader 40.

Hence, the opening of the power source compartment 27a is aligned with the power supply 28 carried by the power supply support 43.

During the relative movement of the vehicle 3 and the automated loader 40, the tapered ends 52 of the first and second guiding pins 43a, b first activate the tilt of the battery cover 27 via the release mechanism 51, then active the battery lock 27b, c causing the battery cover 27 to tilt upwards, thereby removing the blocking teeth 27c from the corresponding recesses 49a in the support rail 49.

By lowering the vehicle 3 towards the rail system 108, the support rails 49 of the battery 28 mesh with the battery support 43. A subsequent retraction of the vehicle 3 would thus leave the power supply 28 on the guiding pins 43a, 43b of the power supply support 43. Alternatively, the power supply support 43 can be raised relative the power supply compartment 27a, thereby releasing the power source 28 from the power supply compartment 27a.

In case there is a need of manual interference for removing the power supply 28 from the power supply compartment 27a, for example due to general maintenance or accidental power supply/battery jamming, a configuration with a protruding release mechanism 50 has an additional advantage in that it allows easy manual unlocking of the power supply 28. That is, the protruding arrangement allows for exertion of sufficient manual force on the release mechanism 50, an operation that would be difficult if for example the release mechanism 50 was arranged deep within the battery cover 27.

Figure 17:
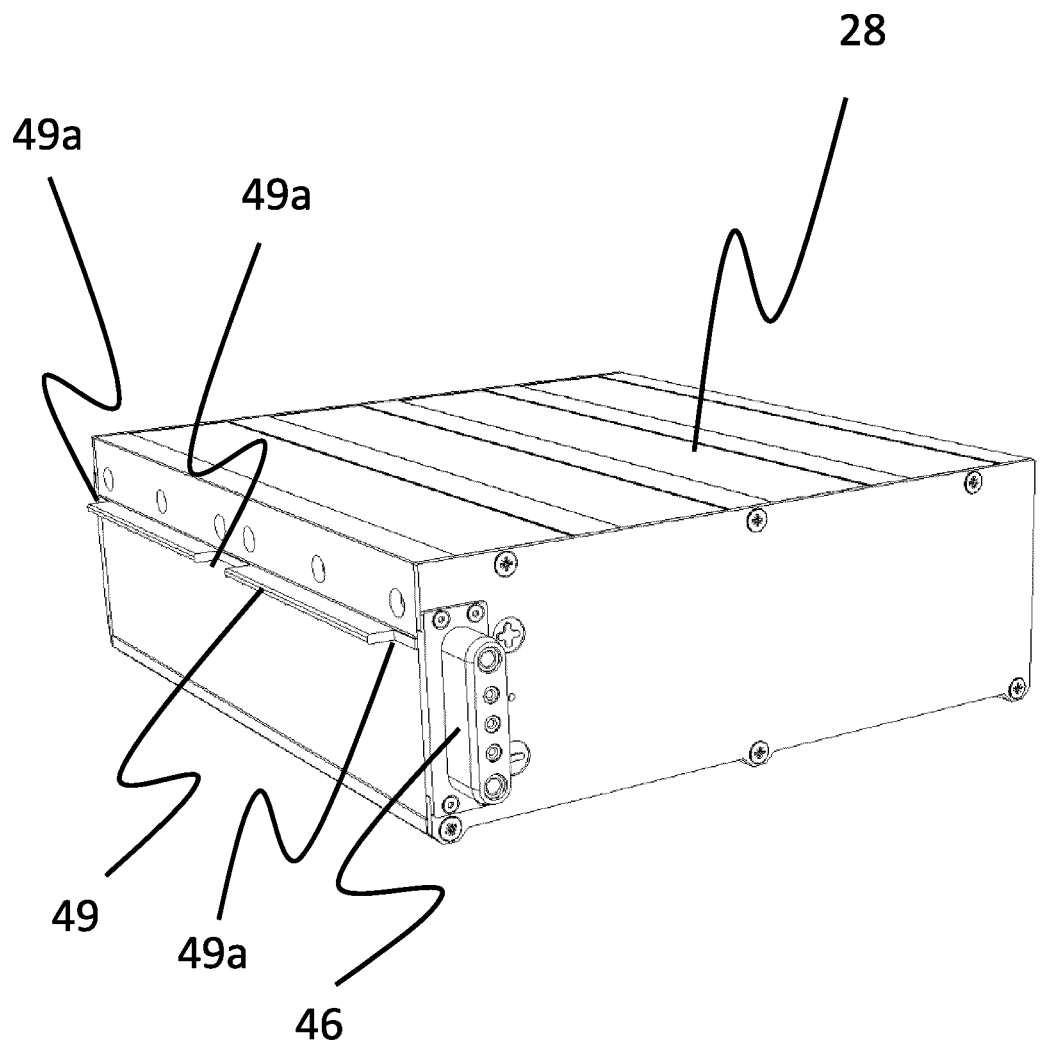
FIG. 17 is a perspective view of a chargeable power storage source.

An example of a power supply in the form of a battery 28 is shown in perspective in FIG. 17. One of two support rails 49 is shown protruding from a side wall of the battery 28. And identical support rail is protruding from the opposite side wall. The purpose of the support rails 49 is to both ensure a stable support of the power supply 28 on the battery support/guiding pins 43 and to ensure an accurate guiding of the power supply 28 into and out of the power supply compartment 27a during exchange. FIG. 18 shows the power supply 28 with support rails 49 being inserted fully within the power supply compartment 27a. In the particular configuration shown in FIG. 18, the power supply 28 is approximately half the maximum allowable volume of a power supply.

Figure 19:
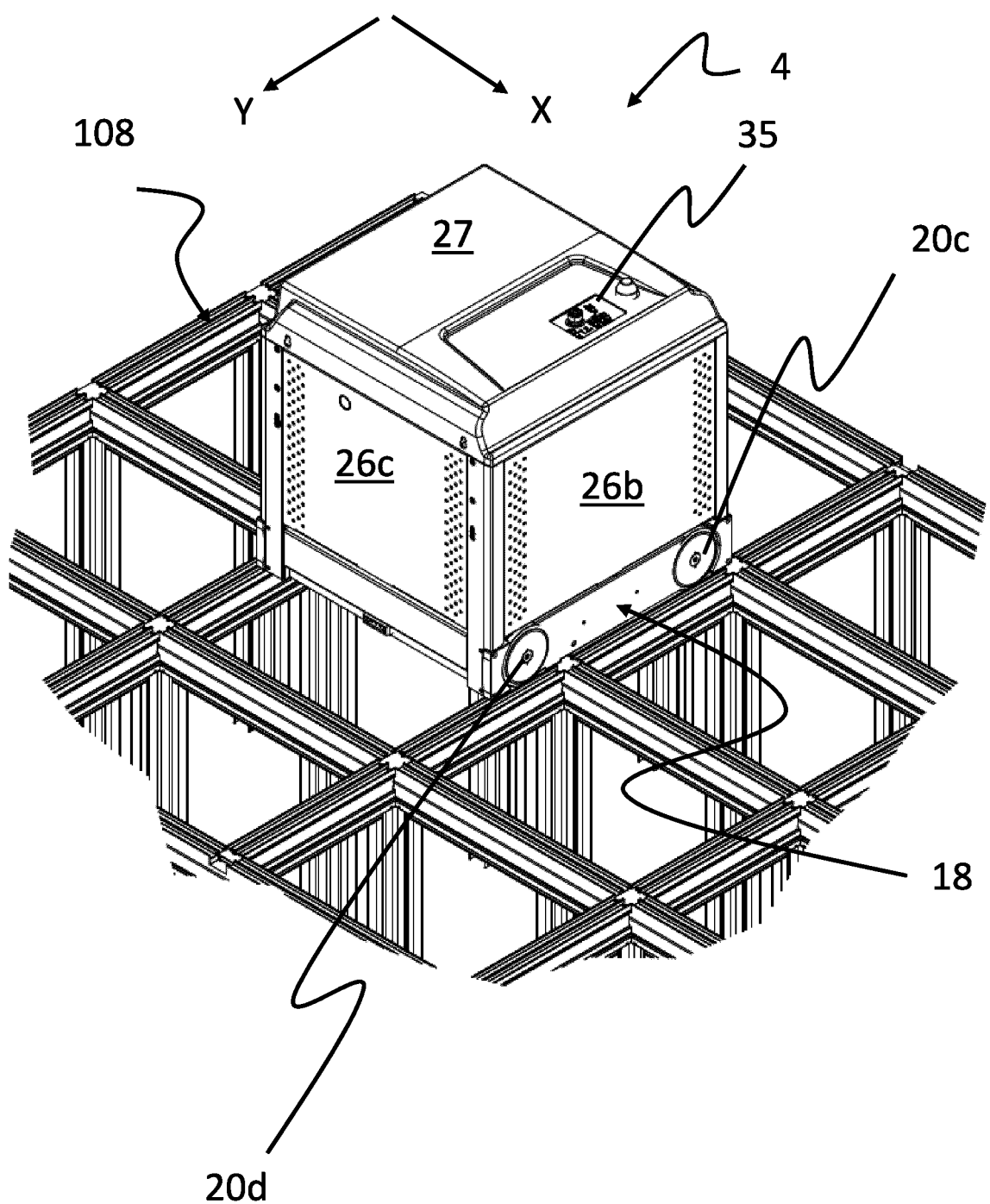
FIG. 19 is a perspective view of a container handling vehicle according to a second embodiment of the invention.

FIG. 19 shows perspective view of a vehicle 4 on a framework structure 100 according a second. As for the vehicle 3 according to the first embodiment, the battery cover(s) 27 enclosing the power supply compartment(s) 27a is for the second and third embodiments arranged above the bin storage space 24.

Figure 20A:
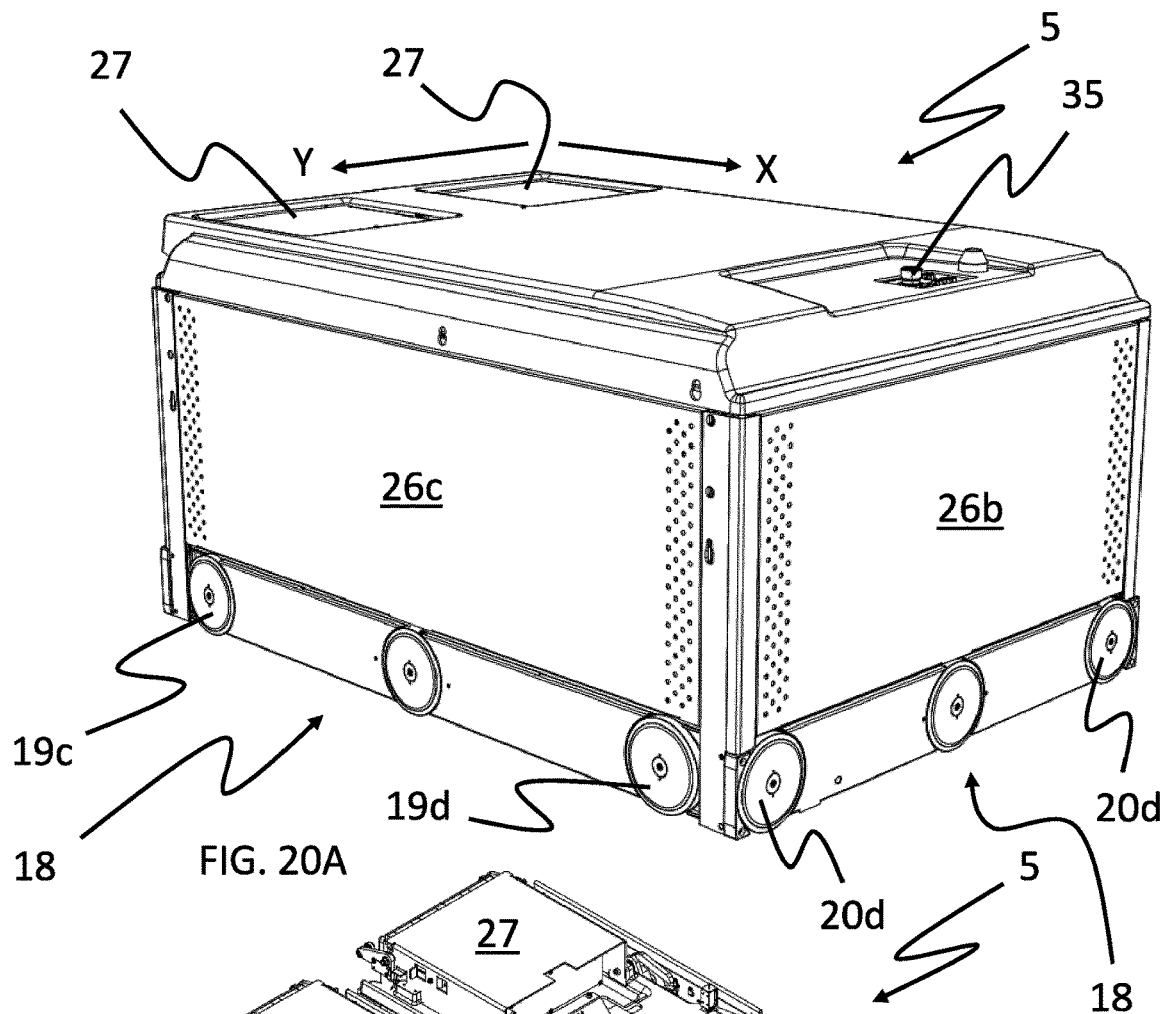
FIGS. 20A and B are perspective side views of a container handling vehicle of a third embodiment of the invention.
Figure 20B:
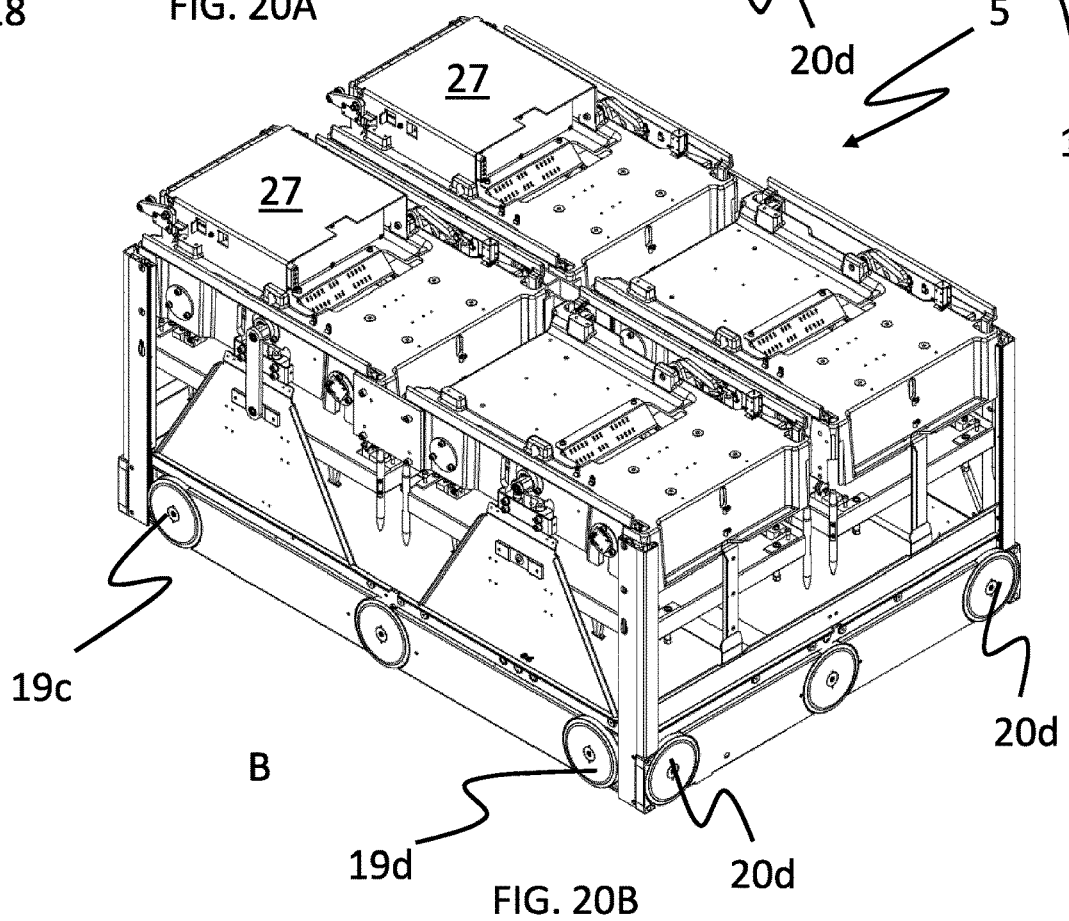

FIGS. 20A and B shows an example of a vehicle 5 comprising two battery covers 27 arranged adjacent to another. In FIG. 20B the outer walls and lid of the vehicle 5 have been removed. In order to inter alia improve weight distribution during lifting and transport, the vehicle 5 comprises six wheels for each wheel set.

Figure 21A:
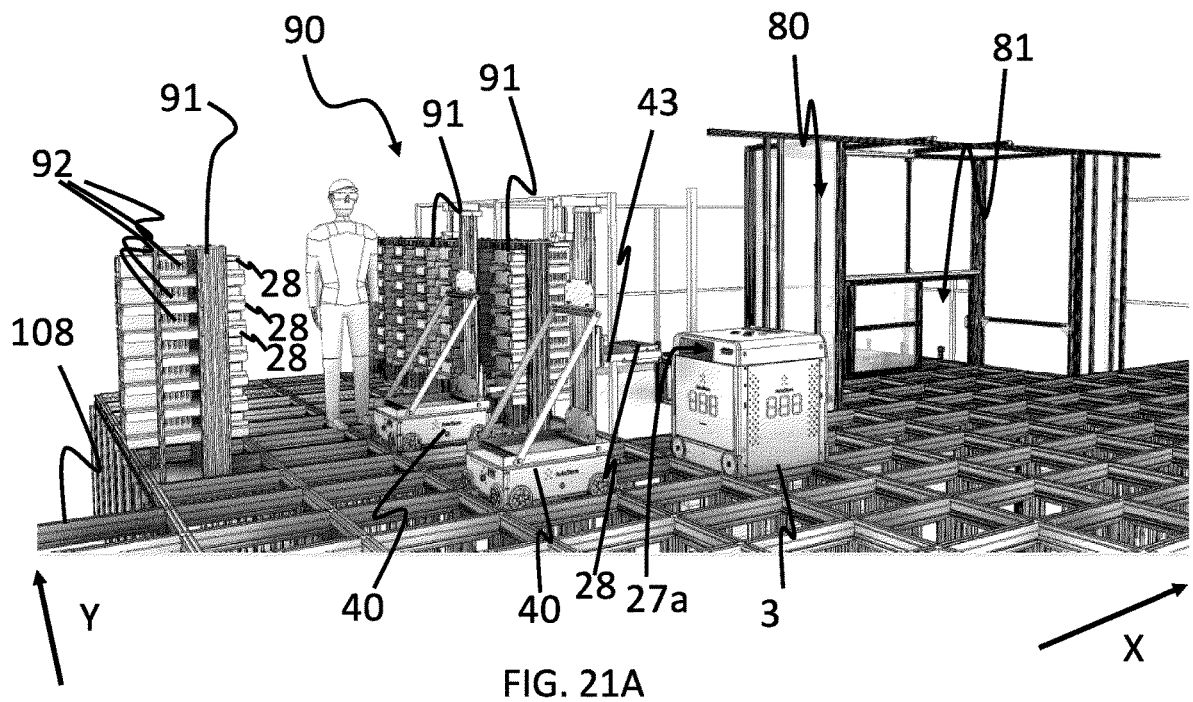
FIGS. 21A and B are perspective views of a first embodiment of a charging station according to the invention.

FIGS. 21A and B are perspective views of the first embodiment of a charging station 90 according to the invention with an automated loader 40 with wheels operating on the rail system 108 where the container handling vehicles 3 operate. In FIG. 21A there is shown a container handling vehicle 3, a horizontal rail system 108 for the container handling vehicle 3 to run on, and a charging station 90 for recharging a replaceable power source 28 of the container handling vehicle 3. The charging station 90 is provided on or at the horizontal rail system 108 and is disclosed with a plurality of vertical charging racks 91, each charging rack 91 providing a column of charging positions 92 for recharging replaceable power supplies 28 and each charging position 92 being configured to accommodate a replaceable power supply 28 during a recharging process. The charging station 90 is further disclosed with an automated loader 40 with wheels operating on the rail system 108. The automated loader 40 is arranged to move vertically and horizontally in the X and Y directions using the wheels for exchanging and transporting a replaceable power supply 28 between the charging position 92 in the charging rack 91 and the power supply compartment 27a of the container handling vehicle 3 by retrieving a replaceable power supply 28 from and inserting a replaceable power supply 28 into a charging position 92 of the charging rack 91 and by retrieving a replaceable power supply 28 from and inserting a replaceable power supply 28 into the power supply compartment 27a of the container handling vehicle 3 by the power supply support 43 of the automated loader 40 extending into said charging position 92 in the charging rack 91 and the power supply compartment 27a of the container handling vehicle 3.

In the disclosed example of FIG. 21A, it is disclosed two automated loaders 40 and a row of charging racks 91 arranged side-by-side and one single charging rack arranged opposite the row of charging racks 91. The number of charging racks 91 as well as the number of charging positions 92 within each rack 91 can be varied depending on the needs. The charging racks 91 may be single modules with a charging position 92 at each level, or may comprise a number of modules with two or more charging positions 92 at each level. The charging rack 91 is preferably connected directly to the top or the side of the rail system 108.

Further referring to FIG. 21A, the automated loader 40 closest to the container handling vehicle 3 carries a power supply 28 using the power supply support 43, and is about to insert a charged power supply 28 into, or has retrieved a used power supply 28 out of, the power supply compartment 27a of the container handling vehicle 3.

Figure 21B:
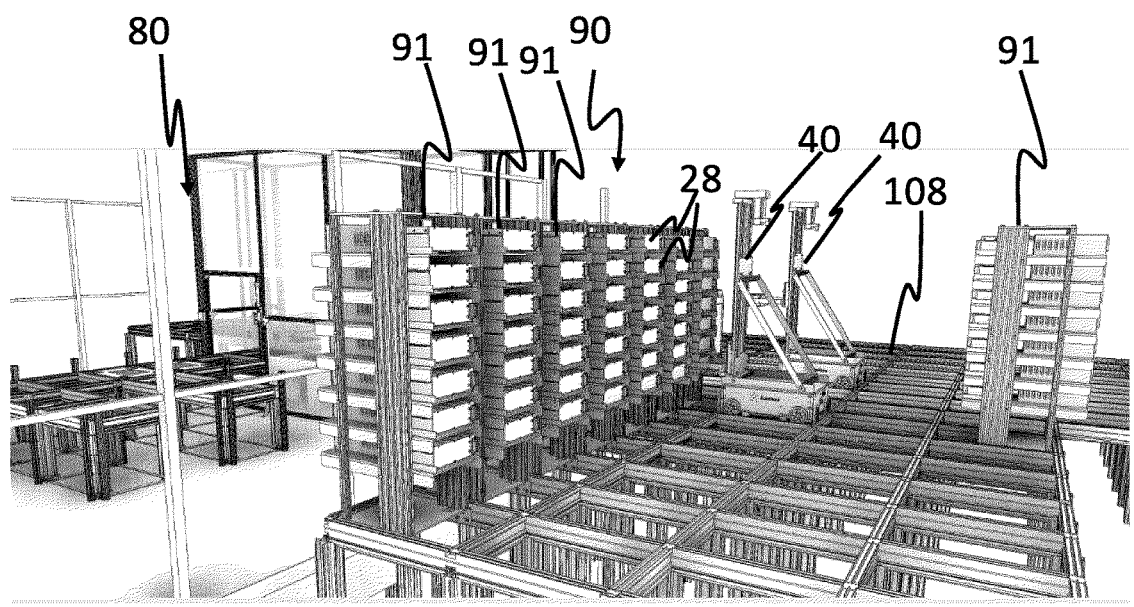

FIG. 21B is a view of the charging station 90 of FIG. 21A from an opposite side. Furthermore, the disclosed charging station 90 is arranged close or adjacent to a service area 80, thereby it is easy to move the container handling vehicles 3 to the service area 80 in the event of failure during power supply/battery 28 change. A service area 80 is normally an area physically separated from the rail system 108 where operators may manually inspect, maintenance or repair container handling vehicles 3. As is seen in FIG. 21A barriers are provided between the rail system 108 and the service area 80, and a port 81 is provided in the barrier for container handling vehicles 3 to pass through said barriers.

Figure 22A:
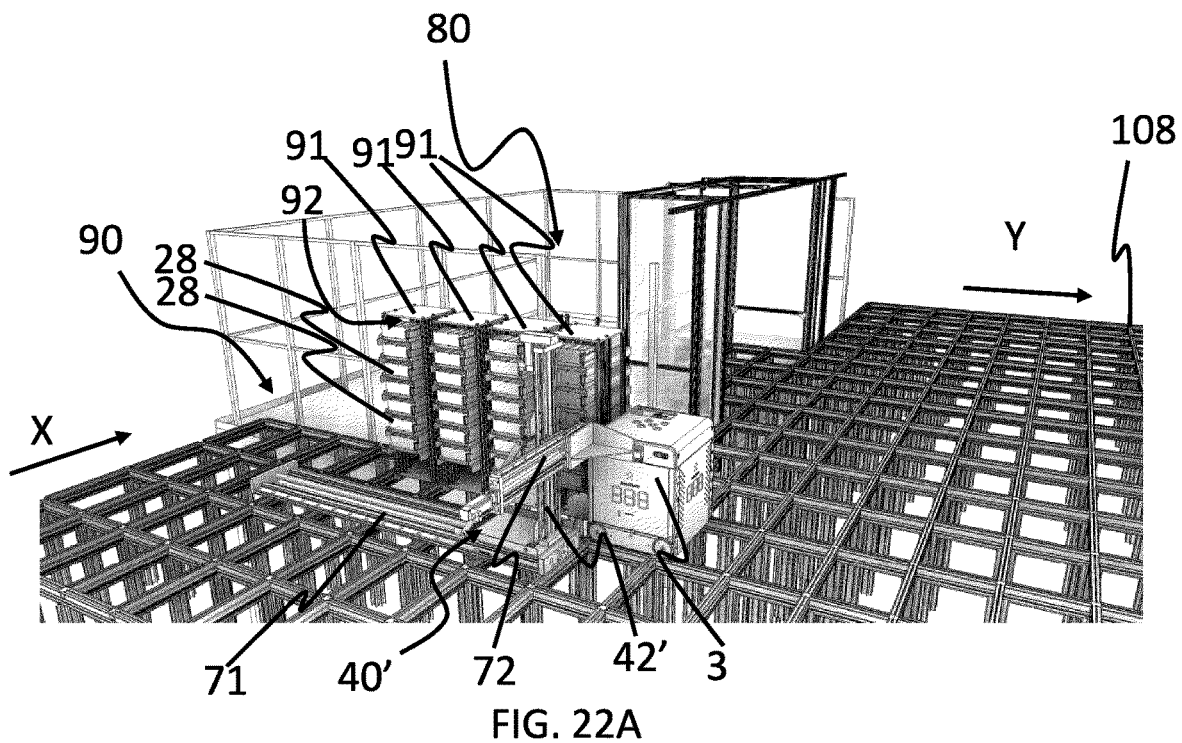
Figure 22B:
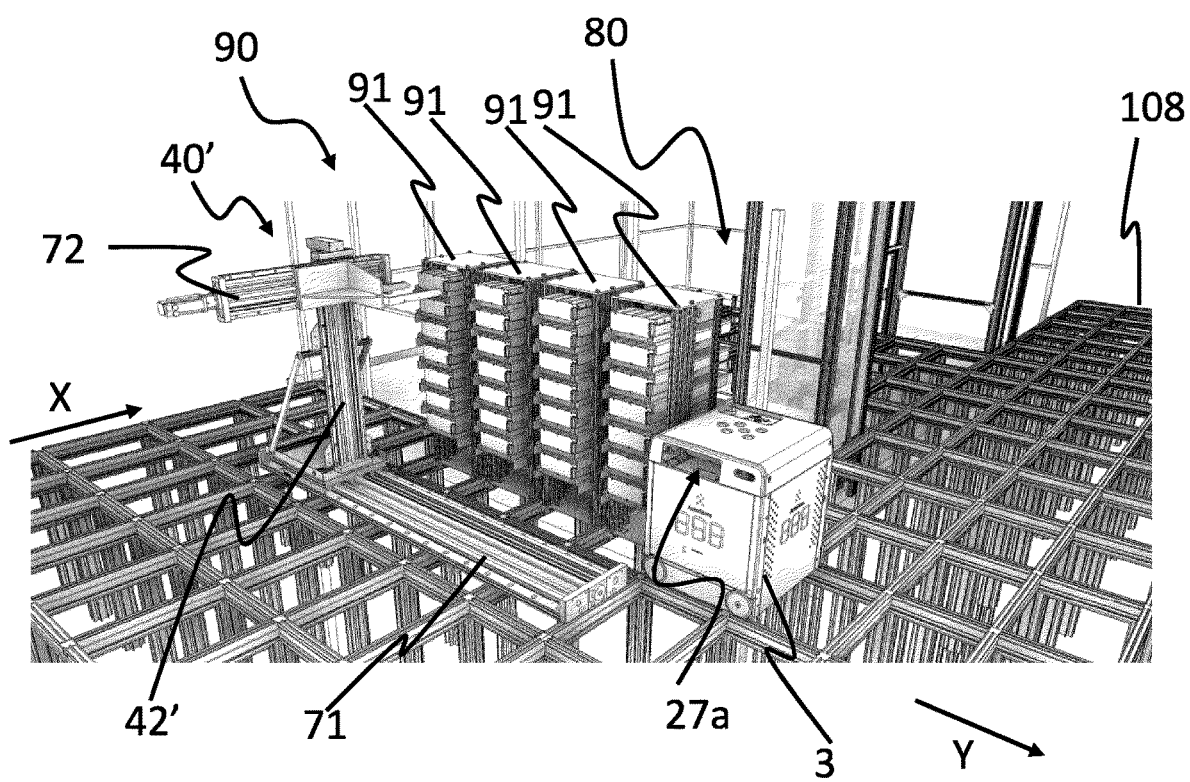

FIGS. 22A-C are perspective views of a second embodiment of a charging station 90 according to the invention with an automated loader 40 on an independent rail system 71 arranged on the rail system 108 where the container handling vehicles 3 operate. In the embodiment in FIGS. 22A-C movement of the automated loader 40' in the XYZ directions is achieved by one set of rails 71 in the X or Y direction which enables horizontal movement in one of said directions, and a linear actuator 72 enables movement in the other X or Y direction, and a vertical column 42' configured for vertical guiding of the power supply support 42' which enables movement in the Z direction.

Figure 23:
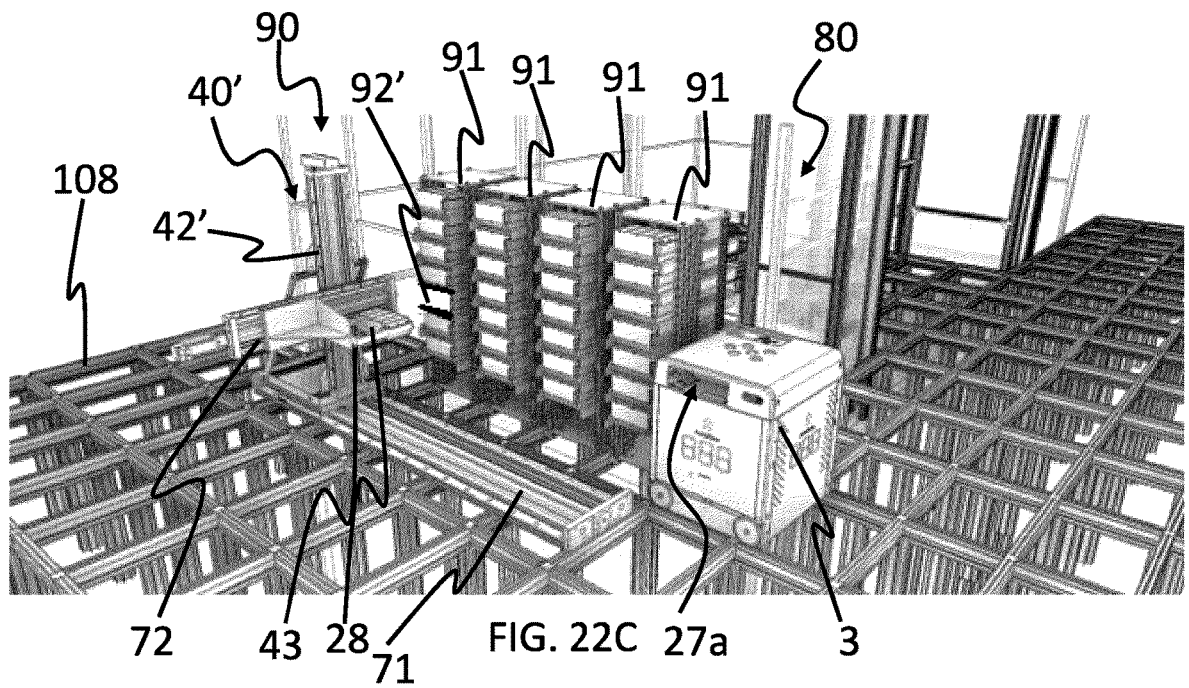
FIG. 23 is a detailed view of a single charging rack.
Figure 23:
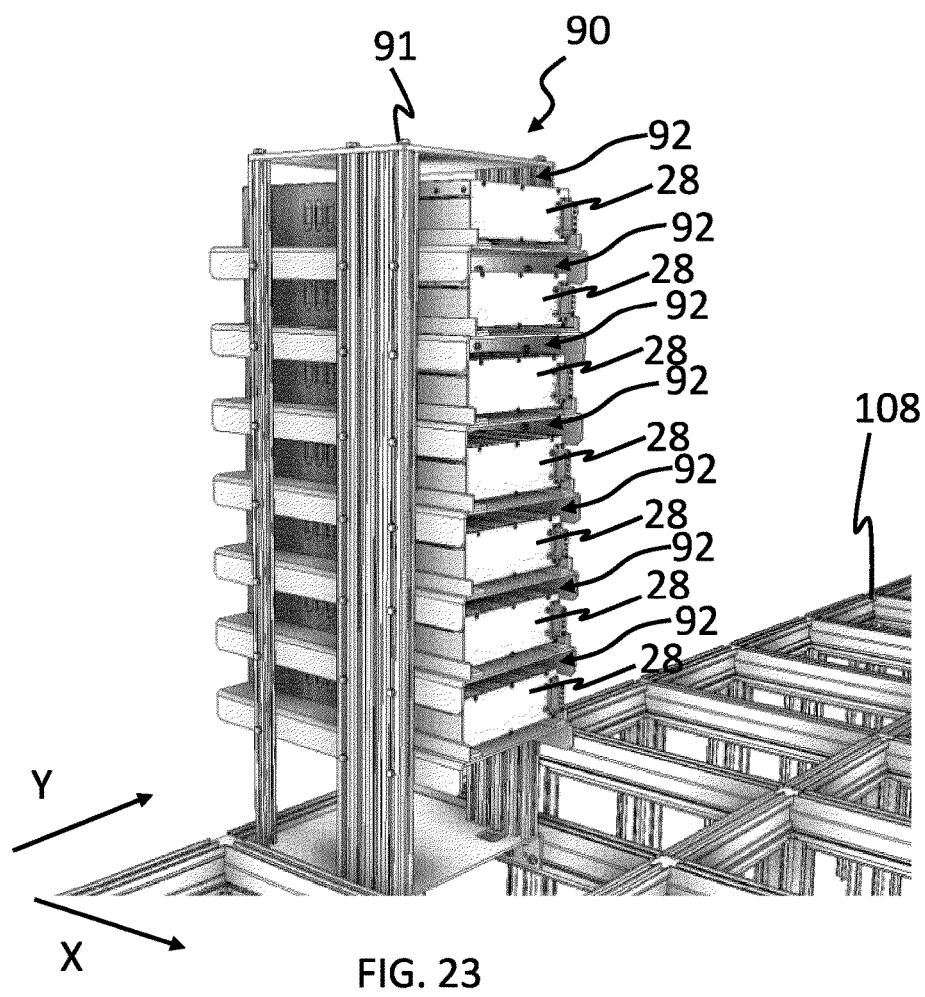

The automated loader 40' in FIGS. 22-23 may comprise a similar power supply support 43 as the automated loader 40 described above.

In the embodiment of FIG. 22A it is disclosed a row comprising four charging racks 91. The rail system 71 of the automated loader 40' is arranged such that relative the charging racks 91 that the power supply support 43 of the automated loader 40' can reach all storage positions 92 in the charging racks 91. In addition, the automated loader 40' is arranged such that the power supply support 43 can access a power supply compartment 27a of a container handling vehicle 3 positioned adjacent the rack. In FIG. 22A, the container handling vehicle 3 in need of a power supply 28 change, has been instructed by the control system to position itself next to the charging rack 91 (on the right hand side in the Figure), such that the automated loader 40' can access the power supply compartment 27a of the container handling vehicle 3 and can easily replace the power supply 28. In FIG. 22A, the guiding pins (not shown) of the power supply support 43 is arranged inside the power supply compartment 27a.

Referring to FIG. 22B, the automated loader 40' has retrieved the power supply 28 from the power supply compartment 27a and put the used power supply 28 into a charging position 92 in the charging rack 91 at the uppermost level in the charging rack 91 (the charging rack to the left in the Figure).

In FIG. 22C, the automated loader 40' has retrieved the power supply 28 from charging position 92' (charging position number three from below in the charging rack 91 to the left in the Figure). The automated loader 40' may then transfer the power supply 28 to the power supply compartment 27a of the container handling vehicle 3 positioned at the opposite end of the row of charging racks 91. The insertion of the power supply 28 into the power supply compartment 27a is performed as discussed above. Once a recharged power supply 28 has been successfully inserted in the container handling vehicle 3, the container handling vehicle 3 may return to its normal tasks of handling storage containers, and another container handling vehicle may arrive in the charging station 90 to have its power supply replaced.

Furthermore, as in FIGS. 21A-B, the disclosed charging station 90 in FIGS. 22A-C is arranged close or adjacent to a service area 80, thereby it is easy to move the container handling vehicles 3 to the service area 80 in the event of failure during power supply/battery 28 change.

Referring to FIG. 23 it is disclosed a detailed view of a charging station 90 with a single charging rack 91 with a plurality of vertical charging positions 92. It is disclosed one charging position 92 at each level in the charging rack 91. Each of the charging positions 92 in the charging rack 91 preferably comprises a charging socket (not shown) at an elevation in the charging position 92 at the same level as the position of corresponding charging plug 46 of the power supply 28. The charging socket is electrically connected to a power supply (not shown), possibly via a power transformer transforming the charging power to the desired power level. The charging socket is further configured to receive a charging plug 46 on the power supply 28 installed on each vehicle 3 (see. FIG. 17), thereby allowing flow of electric power when the charging plug 46 is electrically coupled to the charging socket.

The charging socket may be resiliently attached to the charging position 92 in the charging station rack 42, such that the position of the charging socket is fixed in an upper (unloaded) position when no external force act on the charging socket and in a lower (loaded) position when the charging socket is exposed to the weight of the electrically connected power supply 28. This feature ensures that the charging socket and the charging plug 46 is at the same level relative to each other during connection and disconnection. Having the charging socket biased towards the upper position and able to move into a lower position due to the weight of the battery is a highly advantageous feature since it allows for the use of standard plug/socket charging connectors. Without the feature of having a biased charging socket, a plug and socket would have to be able to move vertically relative to each other while being fully connected (i.e. move relative to each other in a direction being perpendicular to the direction in which they move during connection). Although such plug/socket connectors may be envisioned, they would likely be unable to provide a secure connection having a required charging capacity and reliability. The charging socket and the charging plug 46 may of course be interchanged. In general, any kind of disconnectable electrical connections between the charging position 92 and the power supply 28 is possible.

In the preceding description, various aspects of a charging station and an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

REFERENCE NUMERALS

| | |
|---|---|
| 1 | Automated storage and retrieval system |
| 3 | Vehicle, first embodiment |
| 3a | First vehicle, first embodiment |
| 3b | Second vehicle, first embodiment |
| 4 | Vehicle, second embodiment |
| 5 | Vehicle, third embodiment |
| 17 | Vehicle body |
| 17a | Lower section of vehicle body 17 |
| 17b | Upper section of vehicle body 17 |
| 18 | Wheel assembly/rolling means/rolling device |
| 19 | First set of wheels |
| 19a | First wheel of the first set |
| 19b | Second wheel of the first set |
| 19c | Third wheel of the first set |
| 19d | Fourth wheel of the first set |
| 20 | Second set of wheels |
| 20a | First wheel of the second set |
| 20b | Second wheel of the second set |
| 20c | Third wheel of the second set |
| 20d | Fourth wheel of the second set |
| 21 | Lifting device |
| 22 | Gripping device |
| 23 | Lifting motor |
| 24 | Storage compartment, bin storage space |
| 25 | Side plate (attached to first or second set of wheels) |

-continued

| | |
|---|---|
| 26 | Side walls of vehicle |
| 26a | First side wall oriented in second direction (Y) |
| 26b | Second side wall oriented in second direction (Y) |
| 26c | Third side wall oriented in first direction (X) |
| 26d | Fourth side wall oriented in first direction (X) |
| 27 | Power supply cover/battery cover/battery house |
| 27a | Power supply compartment/power supply compartment |
| 27b | Battery lock activator |
| 27c | Blocking teeth |
| 28 | Power supply/main power supply; battery/main battery |
| 29 | Recessed section |
| 30 | Opening of power supply compartment |
| 32 | Profiled surface, (Protrusion on guiding pin) |
| 35 | Onboard control and communication system |
| 36 | Sidewall/longitudinal element |
| 40 | Automated loader with wheels |
| 40' | Automated loader with independent rail system |
| 42 | Column automated loader first embodiment |
| 42' | Column automated loader second embodiment |
| 43 | Power supply support/battery support/guiding means/guide/guiding pins |
| 43a | First guiding pin |
| 43b | Second guiding pin |
| 44 | Power supply/power transformer |
| 46 | Power supply charging connection/charging socket |
| 49 | Support rail |
| 49a | Recess (in support rail 49) |
| 50 | Release mechanism |
| 51 | Pivot arm |
| 51a | Pivot arm contact element |
| 52b | Security lock (to hinder tilt of power supply cover 27) |
| 52 | Tapered section (of guiding pins) |
| 70 | Base of automated loader |
| 71 | Independent rail system X/Y |
| 72 | Linear actuator |
| 80 | Service area |
| 81 | Port |
| 90 | Charging station |
| 91 | Charging station rack |
| 92 | Charging position |
| 100 | Framework structure |
| 102 | Upright members of framework structure |
| 103 | Horizontal members of framework structure |
| 104 | Storage grid |
| 105 | Storage column |
| 106 | Storage container |
| 106' | Particular position of storage container |
| 107 | Stack |
| 108 | Rail system/track system |
| 110 | Parallel tracks in first direction (X) |
| 110a | First track of neighboring tracks 110 |
| 110b | Second track of neighboring tracks 110 |
| 111 | Parallel tracks in second direction (Y) |
| 111a | First track of neighboring tracks 111 |
| 111b | Second track of neighboring tracks 111 |
| 112 | Grid column |
| 115 | Grid opening |
| 119 | First port column/first port |
| 120 | Second port column/second port |
| 122 | Grid cell/storage cell |
| 201 | Prior art single cell storage container vehicle |
| 201a | Vehicle body of the storage container vehicle 101 |
| 201b | Drive means/wheel arrangement, first direction (X) |
| 201c | Drive means/wheel arrangement, second direction (Y) |
| 301 | Prior art cantilever storage container vehicle |
| 301a | Vehicle body of the storage container vehicle 101 |
| 301b | Drive means in first direction (X) |
| 301c | Drive means in second direction (Y) |
| X | First direction |
| Y | Second direction |
| Z | Third direction |
| P | Horizontal plane |
| D | Distance from termination of column's lower end to the lowermost part of the power supply support |
| L | Distance from the outer perimeter of the column to a geometrical size of the power supply and/or the horizontal center point of the vehicle under charge. |

The invention claimed is:

1. An automated storage and retrieval system comprising at least one container handling vehicle, a horizontal rail system for the container handling vehicle to run on, and a charging station for recharging a replaceable power source of the container handling vehicle, wherein:

the container handling vehicle comprises a first set of wheels for moving the container handling vehicle upon the rail system in a first direction, a second set of wheels for moving the container handling vehicle upon the rail system in a second direction which is perpendicular to the first direction, and a power supply compartment within the container handling vehicle for accommodating a replaceable power supply when the container handling vehicle is in use; and the charging station is provided on or at the horizontal rail system, the charging station comprising one or more charging racks, each charging rack providing a column of charging positions for recharging replaceable power supplies and each charging position being configured to accommodate a replaceable power supply during a recharging process, the charging station further comprising an automated loader comprising a power supply support, the automated loader is arranged to move vertically and horizontally in said first and second directions for exchanging and transporting a replaceable power supply between the charging rack and the power supply compartment of the container handling vehicle by retrieving a first replaceable power supply from and inserting the first replaceable power supply into a charging position of the charging rack and by retrieving a second replaceable power supply from and inserting the second replaceable power supply into the power supply compartment of the container handling vehicle by the automated loader extending into said charging rack and power supply compartment.

2. The system according to claim 1, wherein the automated loader is arranged on the rail system for moving the automated loader in at least one of the first direction or the second direction, wherein the rail system provides access to different grid positions on the rail system.

3. The system according to claim 1, wherein the power supply compartment comprises a power supply locking assembly arranged to hold each of the power supplies in place within the power supply compartment.

4. The system according to claim 3, wherein the power supply locking assembly is movable between a first position, in which the power supply locking assembly may hold one of the power supplies in place, and a second position, wherein the power supply may be moved.

5. The system according to claim 3, wherein the power supply locking assembly is locked in the first position by a releasable locking mechanism.

6. The system according to claim 5, wherein the power supply locking assembly is movable between a first position, in which the power supply locking assembly may hold one of the power supplies in place, and a second position, wherein the power supply may be moved, and wherein the power supply support is arranged to interact or engage with the releasable locking mechanism and/or the power supply locking assembly, such that the power supply locking assembly may move into the second position when the power supply support is extended into the power supply compartment to retrieve a discharged power supply or insert a charged power supply.

7. The system according to claim 4, wherein the power supply locking assembly is pivotably connected to an upper part of the container handling vehicle, such that the power supply locking assembly may pivot between the first and second positions.

8. The system according to claim 1, wherein the power supply support comprises two laterally extending guide arms between which the replaceable power supply may be supported.

9. The system according to claim 8, wherein at least one of the guide arms comprises an end for interaction with a releasable locking mechanism or a power supply locking assembly.

10. The system according to claim 8, wherein the replaceable power supply comprises a support rib arranged on each of two opposite sides of the power supply, each support rib arranged to interact with a corresponding guide arm of the power supply support.

11. The system according to claim 10, wherein each support rib comprises a recess or protrusion for interaction with a profiled surface arranged on the guide arms.

12. The system according to claim 11, wherein the interacting recesses and profiled surface are arranged such that the power supply is prevented from lateral movement when supported by the power supply support.

13. The system according to claim 3, wherein the power supply locking assembly comprises locking elements, wherein the locking elements are arranged to interact with the power supply, optionally via support ribs arranged on each of two opposite sides of the power supply, when the power supply is arranged in the power supply compartment and the power supply locking assembly is in the first position, such that the power supply is prevented from moving in at least a lateral direction.

14. The automated loader for the system according to claim 1, wherein the automated loader is configured for replacing the replaceable power supply, wherein the power supply support comprises two laterally extending guide arms by which the replaceable power supply may be supported, wherein each of the two laterally extending guide arms comprises a tapered end extending beyond a section of each of the guide arms by which the power supply may be supported, wherein the power supply support is arranged for exchanging and transporting the replaceable power supplies between one of the one or more charging racks and the power supply compartment of the container handling vehicle by retrieving the replaceable power supplies out from and inserting the replaceable power supplies into different charging positions at different levels in the charging station rack and the power supply compartment.

15. The automated loader according to claim 14, wherein the section of each guide arm comprises at least one profiled surface for engagement with the power supply, such that lateral movement of a replaceable power supply relative to the guide arms whilst the power supply is being transported between a charging rack and the vehicle, is prevented.

16. A method of transferring a power supply accommodated within a power supply compartment of a container handling vehicle to an unoccupied charging position in a charging rack of a charging station using an automated loader comprising a power supply support,
the container handling vehicle being configured to move on a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks;
the method comprises:
a) maneuvering the vehicle and/or the automated loader into position where the power supply support is at least partly protruding into the power supply compartment containing the power supply,
b) loading the power supply onto the power supply support, and
c) transferring the power supply on the power supply support from the container handling vehicle to the unoccupied position in the charging rack of the charging station.

17. The method according to claim 16, wherein the loading of the power supply from the power supply compartment of the container handling vehicle to the power supply support is achieved by adjusting a height of the power supply compartment relative to the track system.

18. The method according to claim 16, wherein the transfer of the power supply from the power supply compartment of the container handling vehicle to the power supply support is achieved by adjusting a height of the power supply support of the automated loader relative the power supply compartment.

19. The method according to claim 16, wherein the method is conducted on an automated storage and retrieval system comprising at least one container handling vehicle, a horizontal rail system for the container handling vehicle to run on, and a charging station for recharging a replaceable power source of the container handling vehicle, wherein:
the container handling vehicle comprises a first set of wheels for moving the container handling vehicle upon the rail system in a first direction, a second set of wheels for moving the container handling vehicle upon the rail system in a second direction which is perpendicular to the first direction, and a power supply compartment within the container handling vehicle for accommodating a replaceable power supply when the container handling vehicle is in use; and
the charging station is provided on or at the horizontal rail system, the charging station comprising one or more charging racks, each charging rack providing a column of charging positions for recharging replaceable power supplies and each charging position being configured to accommodate a replaceable power supply during a recharging process, the charging station further comprising an automated loader comprising a power supply support, the automated loader is arranged to move vertically and horizontally in said first and second directions for exchanging and transporting a replaceable power supply between the charging rack and the power supply compartment of the container handling vehicle by retrieving a first replaceable power supply from and inserting the first replaceable power supply into a charging position of the charging rack and by retrieving a second replaceable power supply from and inserting the second replaceable power supply into the power supply compartment of the container handling vehicle by the automated loader extending into said charging rack and power supply compartment.

20. A method of retrieving a rechargeable power supply accommodated in a charging position within a charging station rack and loading the rechargeable power supply into an empty power supply compartment of a container handling vehicle using an automated loader comprising a power supply support;

the container handling vehicle being configured to move on a track system comprising a first set of parallel tracks arranged in a horizontal plane and extending in a first direction, and a second set of parallel tracks arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of adjacent tracks of the first set of tracks and a pair of adjacent tracks of the second set of tracks;

the method comprises:
a) maneuvering the automated loader to a charged power supply accommodated within the charging station rack by aligning the power supply support vertically and/or horizontally relative the power supply to be retrieved from the rack,
b) loading the power supply onto the power supply support,
c) transferring the power supply on the power supply support from the charging station rack to the power supply compartment of the container handling vehicle.

* * * * *